United States Patent
Van Hoff et al.

(10) Patent No.: US 11,019,258 B2
(45) Date of Patent: *May 25, 2021

(54) AGGREGATING IMAGES AND AUDIO DATA TO GENERATE CONTENT

(71) Applicant: Verizon Patent and Licensing Inc., Basking Ridge, NJ (US)

(72) Inventors: Arthur Van Hoff, Palo Alto, CA (US); Thomas M. Annau, Palo Alto, CA (US); Jens Christensen, Palo Alto, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/404,773

(22) Filed: May 7, 2019

(65) Prior Publication Data

US 2019/0260930 A1 Aug. 22, 2019

Related U.S. Application Data

(63) Continuation-in-part of application No. 14/465,575, filed on Aug. 21, 2014, now Pat. No. 10,334,220.

(Continued)

(51) Int. Cl.
| | |
|---|---|
| *H04N 5/232* | (2006.01) |
| *H04N 13/282* | (2018.01) |
| *H04N 13/246* | (2018.01) |
| *G06T 3/40* | (2006.01) |
| *H04N 13/279* | (2018.01) |
| *H04N 5/357* | (2011.01) |
| *H04N 13/106* | (2018.01) |
| *H04N 13/15* | (2018.01) |

(Continued)

(52) U.S. Cl.
CPC ....... *H04N 5/23238* (2013.01); *G06T 3/4038* (2013.01); *H04N 13/246* (2018.05); *H04N 13/279* (2018.05); *H04N 13/282* (2018.05)

(58) Field of Classification Search
USPC .................. 386/223–224, 239–248, 341
See application file for complete search history.

(56) References Cited

U.S. PATENT DOCUMENTS

| | | |
|---|---|---|
| 4,507,683 A | 3/1985 | Griesshaber et al. |
| 5,495,576 A | 2/1996 | Ritchey |
| | (Continued) | |

FOREIGN PATENT DOCUMENTS

| | | |
|---|---|---|
| RU | 2382406 | 2/2010 |
| RU | 2421933 | 6/2011 |
| WO | 2012/113988 | 8/2012 |

OTHER PUBLICATIONS

US 5,747,644 A1, 06/2004, Deering (withdrawn)
(Continued)

*Primary Examiner* — Hung Q Dang

(57) ABSTRACT

The disclosure includes generating a stream of panoramic images. A method includes determining a first matching camera module. The method includes constructing a first camera map that associates a first pixel location in a first panoramic image to the first matching camera module, wherein the first pixel location corresponds to the point in a panorama from a first viewing direction. The method includes generating, based on the first camera map, a stream of first panoramic images.

20 Claims, 15 Drawing Sheets

Related U.S. Application Data

(60) Provisional application No. 62/029,254, filed on Jul. 25, 2014, provisional application No. 62/008,215, filed on Jun. 5, 2014, provisional application No. 62/004,645, filed on May 29, 2014, provisional application No. 61/868,527, filed on Aug. 21, 2013.

(51) Int. Cl.
*H04N 13/194* (2018.01)
*H04N 13/243* (2018.01)

(56) References Cited

U.S. PATENT DOCUMENTS

| | | | |
|---|---|---|---|
| 6,128,108 A | 10/2000 | Teo | |
| 6,141,034 A | 10/2000 | McCutchen | |
| 6,212,468 B1 | 4/2001 | Nakayama et al. | |
| 6,767,287 B1 | 7/2004 | McQuaid et al. | |
| 6,865,289 B1 | 3/2005 | Berestov | |
| 7,155,680 B2 | 12/2006 | Akazawa et al. | |
| 7,884,848 B2 | 2/2011 | Ginther | |
| 8,478,111 B2 | 7/2013 | Stankiewicz et al. | |
| 8,581,961 B2 | 11/2013 | Lee | |
| 8,644,596 B1 | 2/2014 | Wu et al. | |
| 8,681,224 B2 | 3/2014 | Mallon et al. | |
| 8,750,509 B2 | 6/2014 | Renkis | |
| 8,848,066 B2 | 9/2014 | Porter et al. | |
| 8,867,827 B2 | 10/2014 | Yeatman et al. | |
| 9,001,226 B1 | 4/2015 | Ng et al. | |
| 9,262,831 B2 | 2/2016 | Munzenmayer et al. | |
| 9,264,598 B1 | 2/2016 | Baldwin | |
| 9,282,367 B2 | 3/2016 | Daub | |
| 9,396,588 B1 | 7/2016 | Li | |
| 9,589,350 B1 | 3/2017 | Kozko | |
| 9,742,991 B2 | 8/2017 | Latorre | |
| 9,774,887 B1 | 9/2017 | Walkingshaw | |
| 9,911,454 B2 | 3/2018 | Van Hoff et al. | |
| 10,210,898 B2 | 2/2019 | Van Hoff et al. | |
| 10,313,665 B2 | 6/2019 | Walkingshaw | |
| 10,440,398 B2 | 10/2019 | Walkingshaw et al. | |
| 2001/0015751 A1 | 8/2001 | Geng | |
| 2002/0075295 A1 | 6/2002 | Stentz et al. | |
| 2002/0171741 A1 | 11/2002 | Tonkin et al. | |
| 2003/0025805 A1 | 2/2003 | Yamagishi | |
| 2003/0117488 A1* | 6/2003 | Pierce | H04N 5/23238 348/48 |
| 2004/0008256 A1 | 1/2004 | Kim | |
| 2004/0027451 A1 | 2/2004 | Baker | |
| 2004/0066449 A1 | 4/2004 | Givon | |
| 2004/0196378 A1 | 10/2004 | Kannermark et al. | |
| 2004/0246333 A1 | 12/2004 | Steuart | |
| 2005/0062869 A1 | 3/2005 | Zimmermann et al. | |
| 2005/0069167 A1 | 3/2005 | Zarrabizadeh | |
| 2006/0082663 A1 | 4/2006 | Rooy et al. | |
| 2007/0027844 A1 | 2/2007 | Toub et al. | |
| 2007/0035627 A1 | 2/2007 | Cleary et al. | |
| 2007/0097206 A1 | 5/2007 | Houvener et al. | |
| 2007/0146530 A1 | 6/2007 | Nose | |
| 2007/0159527 A1 | 7/2007 | Kim et al. | |
| 2007/0263076 A1 | 11/2007 | Andrews et al. | |
| 2008/0091526 A1 | 4/2008 | Shoemaker | |
| 2008/0143842 A1 | 6/2008 | Gillard et al. | |
| 2008/0262910 A1 | 10/2008 | Altberg et al. | |
| 2008/0263458 A1 | 10/2008 | Altberg et al. | |
| 2009/0076894 A1 | 3/2009 | Bates et al. | |
| 2009/0238378 A1 | 9/2009 | Kikinis et al. | |
| 2009/0249244 A1 | 10/2009 | Robinson et al. | |
| 2009/0288002 A1 | 11/2009 | Hamilton et al. | |
| 2010/0036735 A1 | 2/2010 | Hamilton et al. | |
| 2010/0045773 A1 | 2/2010 | Ritchey | |
| 2010/0083139 A1 | 4/2010 | Dawson et al. | |
| 2010/0097444 A1 | 4/2010 | Lablans | |
| 2010/0100429 A1 | 4/2010 | McCloskey et al. | |
| 2010/0119105 A1 | 5/2010 | Moriya et al. | |
| 2010/0141733 A1 | 6/2010 | Borchers et al. | |
| 2010/0164956 A1 | 7/2010 | Hyndman et al. | |
| 2010/0169842 A1 | 7/2010 | Migos | |
| 2010/0315479 A1 | 12/2010 | Wijngaarden et al. | |
| 2010/0318467 A1 | 12/2010 | Porter et al. | |
| 2010/0332980 A1 | 12/2010 | Sun et al. | |
| 2011/0058749 A1 | 3/2011 | Cooper | |
| 2011/0142132 A1 | 6/2011 | Tourapis et al. | |
| 2011/0157305 A1 | 6/2011 | Kosakai et al. | |
| 2011/0193956 A1 | 8/2011 | Gilg et al. | |
| 2011/0267510 A1 | 11/2011 | Malone et al. | |
| 2012/0050474 A1 | 3/2012 | Segall | |
| 2012/0056977 A1 | 3/2012 | Ohnishi | |
| 2012/0069236 A1 | 3/2012 | Namba et al. | |
| 2012/0105632 A1 | 5/2012 | Renkis | |
| 2012/0113278 A1 | 5/2012 | Okada | |
| 2012/0155786 A1* | 6/2012 | Zargarpour | G03B 35/08 382/284 |
| 2012/0162362 A1 | 6/2012 | Garden et al. | |
| 2012/0169842 A1 | 7/2012 | Chuang et al. | |
| 2012/0194712 A1 | 8/2012 | Crook et al. | |
| 2012/0203640 A1 | 8/2012 | Karmarkar et al. | |
| 2012/0218296 A1 | 8/2012 | Belimpasakis et al. | |
| 2012/0218376 A1 | 8/2012 | Athan | |
| 2012/0232998 A1 | 9/2012 | Schoen | |
| 2012/0240077 A1 | 9/2012 | Vaittinen et al. | |
| 2012/0242788 A1 | 9/2012 | Chuang et al. | |
| 2012/0242794 A1* | 9/2012 | Park | G06K 9/32 348/46 |
| 2012/0257095 A1 | 10/2012 | Velazquez | |
| 2012/0290401 A1 | 11/2012 | Neven | |
| 2012/0310717 A1 | 12/2012 | Kankainen | |
| 2012/0324493 A1 | 12/2012 | Holmdahl et al. | |
| 2012/0324494 A1 | 12/2012 | Burger et al. | |
| 2013/0016186 A1 | 1/2013 | Atanassov et al. | |
| 2013/0031475 A1 | 1/2013 | Maor et al. | |
| 2013/0035110 A1 | 2/2013 | Sridhara et al. | |
| 2013/0044187 A1 | 2/2013 | Hammes et al. | |
| 2013/0054576 A1 | 2/2013 | Karmarkar et al. | |
| 2013/0080974 A1 | 3/2013 | Suzuki | |
| 2013/0083159 A1 | 4/2013 | Ooshima | |
| 2013/0103624 A1 | 4/2013 | Thieberger | |
| 2013/0117375 A1 | 5/2013 | Bist et al. | |
| 2013/0124471 A1 | 5/2013 | Chen et al. | |
| 2013/0188010 A1 | 7/2013 | Dortch et al. | |
| 2013/0212606 A1 | 8/2013 | Kannan et al. | |
| 2013/0223537 A1 | 8/2013 | Kasai et al. | |
| 2013/0235347 A1 | 9/2013 | Hennessey et al. | |
| 2013/0250047 A1 | 9/2013 | Hollinger | |
| 2013/0258044 A1 | 10/2013 | Betts-Lacroix | |
| 2013/0259447 A1 | 10/2013 | Sathish et al. | |
| 2013/0266211 A1 | 10/2013 | Tippetts et al. | |
| 2013/0278631 A1 | 10/2013 | Border et al. | |
| 2013/0278635 A1 | 10/2013 | Maggiore | |
| 2014/0005484 A1 | 1/2014 | Charles | |
| 2014/0067828 A1 | 3/2014 | Archibong et al. | |
| 2014/0071234 A1 | 3/2014 | Millett | |
| 2014/0086446 A1 | 3/2014 | Han et al. | |
| 2014/0089097 A1 | 3/2014 | Byun et al. | |
| 2014/0097251 A1 | 4/2014 | Joussen et al. | |
| 2014/0099022 A1 | 4/2014 | McNamer | |
| 2014/0099623 A1 | 4/2014 | Amit et al. | |
| 2014/0104378 A1 | 4/2014 | Kauff et al. | |
| 2014/0125771 A1 | 5/2014 | Lee et al. | |
| 2014/0126066 A1 | 5/2014 | Clavin et al. | |
| 2014/0132788 A1* | 5/2014 | Ramsay | H04N 5/23238 348/218.1 |
| 2014/0146132 A1 | 5/2014 | Bagnato et al. | |
| 2014/0153916 A1 | 6/2014 | Kintner | |
| 2014/0176749 A1 | 6/2014 | Horowitz | |
| 2014/0184550 A1 | 7/2014 | Hennessey et al. | |
| 2014/0201126 A1 | 7/2014 | Zadeh et al. | |
| 2014/0232822 A1 | 8/2014 | Venkataraman et al. | |
| 2014/0237495 A1 | 8/2014 | Jang et al. | |
| 2014/0245335 A1 | 8/2014 | Holden et al. | |
| 2014/0247352 A1 | 9/2014 | Rathi et al. | |
| 2014/0267596 A1 | 9/2014 | Geerds | |
| 2014/0270684 A1 | 9/2014 | Jayaram et al. | |
| 2014/0280549 A1 | 9/2014 | Rajan et al. | |
| 2014/0285486 A1 | 9/2014 | Chang et al. | |

(56) References Cited

U.S. PATENT DOCUMENTS

| | | |
|---|---|---|
| 2014/0300532 A1 | 10/2014 | Karkkainen et al. |
| 2014/0309495 A1 | 10/2014 | Kirma et al. |
| 2014/0310630 A1 | 10/2014 | Asikainen et al. |
| 2014/0320608 A1 | 10/2014 | Muukki |
| 2014/0341484 A1 | 11/2014 | Sebring |
| 2014/0359647 A1 | 12/2014 | Shoemake et al. |
| 2014/0359656 A1 | 12/2014 | Banica et al. |
| 2014/0368609 A1 | 12/2014 | Chang et al. |
| 2015/0012827 A1 | 1/2015 | Elmeih et al. |
| 2015/0026718 A1 | 1/2015 | Seyller |
| 2015/0042953 A1 | 2/2015 | Teller |
| 2015/0050006 A1 | 2/2015 | Sipe |
| 2015/0058630 A1 | 2/2015 | Bae et al. |
| 2015/0067708 A1 | 3/2015 | Jensen et al. |
| 2015/0124088 A1 | 5/2015 | Vera et al. |
| 2015/0130705 A1 | 5/2015 | Im |
| 2015/0138065 A1 | 5/2015 | Alfieri |
| 2015/0169076 A1 | 6/2015 | Cohen et al. |
| 2015/0199006 A1 | 7/2015 | He et al. |
| 2015/0206329 A1 | 7/2015 | Devries |
| 2015/0208131 A1 | 7/2015 | Chatter et al. |
| 2015/0220768 A1 | 8/2015 | Ronnecke et al. |
| 2015/0235434 A1 | 8/2015 | Miller et al. |
| 2015/0248918 A1 | 9/2015 | Tang |
| 2015/0260526 A1 | 9/2015 | Paduano et al. |
| 2015/0264092 A1 | 9/2015 | Herger et al. |
| 2015/0271483 A1 | 9/2015 | Sun et al. |
| 2015/0309310 A1 | 10/2015 | Cho et al. |
| 2015/0316982 A1 | 11/2015 | Miller |
| 2015/0317353 A1 | 11/2015 | Zavesky |
| 2015/0350561 A1 | 12/2015 | Vartanian |
| 2015/0356371 A1 | 12/2015 | Libal et al. |
| 2015/0373266 A1 | 12/2015 | Hsieh et al. |
| 2015/0379697 A1 | 12/2015 | Pohl |
| 2016/0011658 A1 | 1/2016 | Lopez et al. |
| 2016/0026253 A1 | 1/2016 | Bradski et al. |
| 2016/0027216 A1 | 1/2016 | Da Veiga et al. |
| 2016/0037026 A1 | 2/2016 | Kintner |
| 2016/0037030 A1 | 2/2016 | Weissig et al. |
| 2016/0050370 A1 | 2/2016 | Campbell |
| 2016/0077710 A1 | 3/2016 | Lewis et al. |
| 2016/0156842 A1 | 6/2016 | Baldwin |
| 2016/0279516 A1 | 9/2016 | Gupta et al. |
| 2016/0286137 A1 | 9/2016 | Marks et al. |
| 2016/0295194 A1 | 10/2016 | Wang et al. |
| 2016/0306431 A1 | 10/2016 | Stafford et al. |
| 2017/0278306 A1 | 9/2017 | Rico |
| 2017/0280056 A1* | 9/2017 | Chapdelaine-Couture ............... H04N 5/23238 |
| 2017/0329817 A1 | 11/2017 | Stoica-Beck et al. |
| 2018/0096507 A1 | 4/2018 | Valdivia et al. |
| 2018/0192094 A1 | 7/2018 | Barnett et al. |
| 2018/0357810 A1 | 12/2018 | Young et al. |
| 2019/0052869 A1 | 2/2019 | Lutter et al. |
| 2019/0052870 A1 | 2/2019 | Lutter et al. |
| 2019/0265945 A1 | 8/2019 | Newell et al. |

OTHER PUBLICATIONS

Mase, et al., "Socially assisted multi-view video viewer", Proceedings of the 13th International Conference on Multimodal Interfaces, ACM, Nov. 2011, pp. 319-322.

* cited by examiner

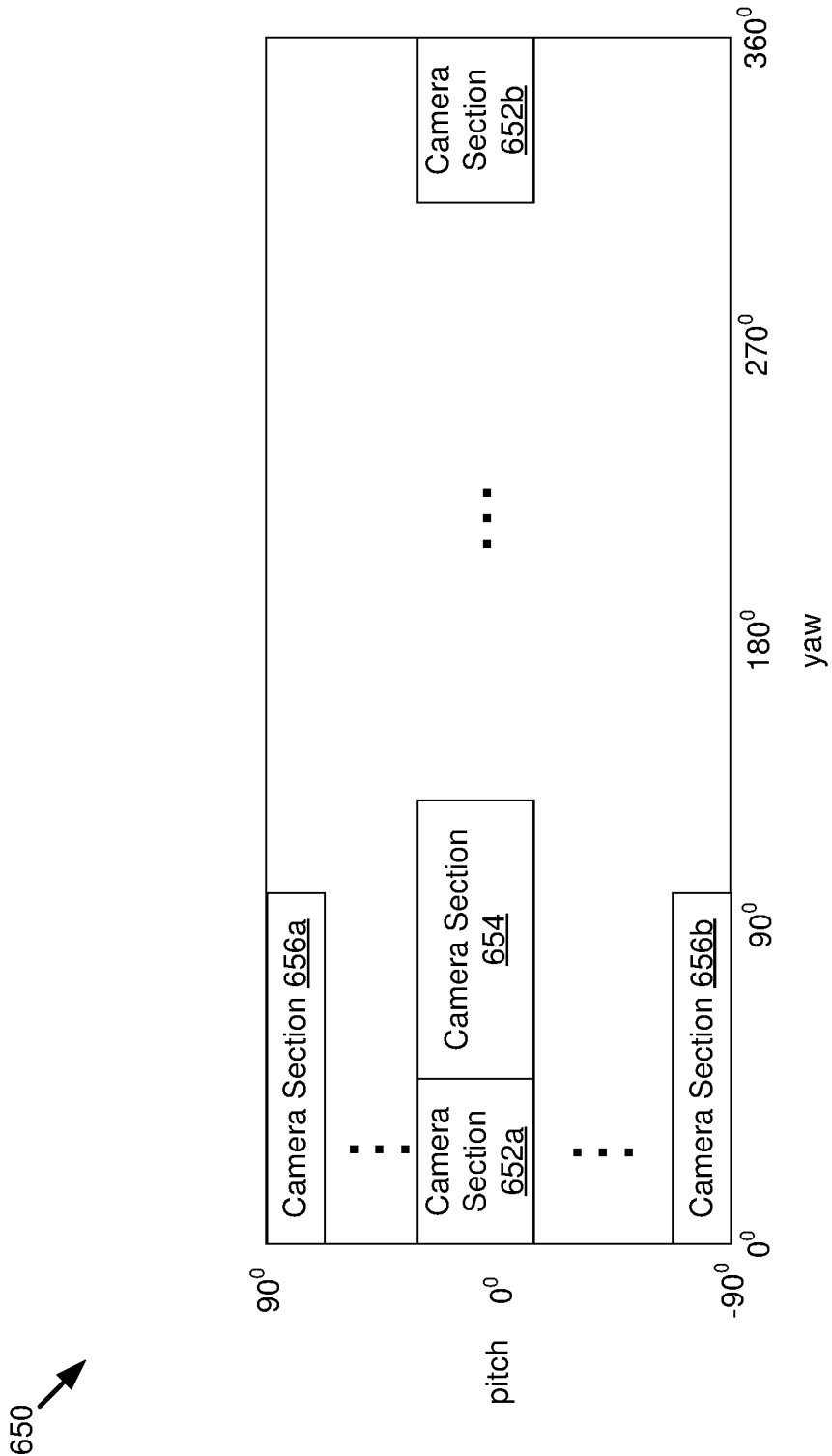

AGGREGATING IMAGES AND AUDIO DATA TO GENERATE CONTENT

CROSS-REFERENCE TO RELATED APPLICATIONS

The application is a continuation-in-part of U.S. application Ser. No. 14/465,575, entitled "Aggregating Images and Audio Data to Generate Virtual Reality Content" filed on Aug. 21, 2014, the entirety of which is hereby incorporated by reference. This application claims priority under 35 USC § 119(e) to U.S. Application No. 61/868,527, entitled "Panoptic Virtual Presence System and Method" filed Aug. 21, 2013, U.S. Application No. 62/004,645, entitled "Camera Array Including Camera Modules" filed May 29, 2014, U.S. Application No. 62/008,215, entitled "Color Consensus" filed Jun. 5, 2014, and U.S. Application No. 62/029,254, entitled "Virtual Presence" filed Jul. 25, 2014. In addition, this application is related to U.S. application Ser. No. 14/444,938, entitled "Camera Array Including Camera Modules" filed Jul. 28, 2014, U.S. application Ser. No. 14/465,581, entitled "Image Stitching" filed Aug. 21, 2014 and U.S. application Ser. No. 14/465,570, entitled "Generating Content for a Virtual Reality System" filed Aug. 21, 2014. Each of the foregoing applications is herein incorporated in its entirety by reference.

FIELD

The implementations discussed herein are related to a virtual presence system and method. More particularly, the implementations discussed herein relate to aggregating image frames from a camera array and audio data from a microphone array to generate virtual reality (VR) content.

BACKGROUND

Some VR goggles are released to the market. These goggles may combine a screen, gyroscopic sensors, and accelerometers to create a VR viewing system with a wide field of view and responsive head-tracking. Many of these VR goggles are initially aimed at the gaming market, and early reactions indicate they will be popular.

The subject matter claimed herein is not limited to implementations that solve any disadvantages or that operate only in environments such as those described above. Rather, this background is only provided to illustrate one example technology area where some implementations described herein may be practiced.

SUMMARY

According to one innovative aspect of the subject matter described in this disclosure, a system for aggregating image frames and audio data to generate virtual reality content includes one or more processors and one or more non-transitory tangible computer-readable mediums communicatively coupled to the one or more processors and storing executable instructions executable by the one or more processors to perform operations including: receiving video data describing image frames from camera modules; receiving audio data from a microphone array; aggregating the stream of 3D video data including a stream of left panoramic images and a stream of right panoramic images; generating a stream of 3D audio data from the audio data; and generating virtual reality content that includes the stream of 3D video data and the stream of 3D audio data.

In general, yet another innovative aspect of the subject matter described in this disclosure may be embodied in methods that include: receiving video data describing image frames from camera modules; receiving audio data from a microphone array; aggregating the stream of 3D video data including a stream of left panoramic images and a stream of right panoramic images; generating a stream of 3D audio data from the audio data; and generating virtual reality content that includes the stream of 3D video data and the stream of 3D audio data.

Other aspects include corresponding methods, systems, apparatus, and computer program products for these and other innovative aspects.

These and other implementations may each optionally include one or more of the following operations and features. For instance, the features include: identifying first matching camera modules for left panoramic images based on a left camera map; identifying second matching camera modules for right panoramic images based on a right camera map; stitching first image frames captured by the first matching camera modules at a particular time to form a corresponding left panoramic image in the stream of left panoramic images; stitching second image frames captured by the second matching camera modules at a particular time to form a corresponding right panoramic image in the stream of right panoramic images; for a pixel with a yaw value and a pitch value in a panorama: the left camera map identifying a first matching camera module for the pixel in the panorama and matching the pixel in the panorama to a pixel in an image plane of the first matching camera module, and the right camera map identifying a second matching camera module for the pixel in the panorama and matching the pixel in the panorama to a pixel in an image plane of the second matching camera module; the left camera map associating a pixel location in left panoramic images to a corresponding first matching camera module, the pixel location corresponding to a point of a panorama in a left viewing direction; the corresponding first matching camera module having a field of view that includes a viewing direction to the point of the panorama; the viewing direction of the corresponding first matching camera module being closer to the left viewing direction than other viewing directions associated with other camera modules; determining a current viewing direction associated with a user; generating the stream of left panoramic images and the stream of right panoramic images based on the current viewing direction; the left panoramic images having a higher resolution in the current viewing direction of the user than a second viewing direction opposite to the current viewing direction; the right panoramic images having a higher resolution in the current viewing direction of the user than the second viewing direction opposite to the current viewing direction.

For instance, the operations include: correcting color deficiencies in the left panoramic images and the right panoramic images; and correcting stitching errors in the left panoramic images and the right panoramic images.

The object and advantages of the implementations will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example implementations will be described and explained with additional specificity and detail through the use of the accompanying drawings in which:

FIG. 6B is a graphic representation that illustrates an example camera map;

DETAILED DESCRIPTION OF SOME EXAMPLE IMPLEMENTATIONS

Figure 1:
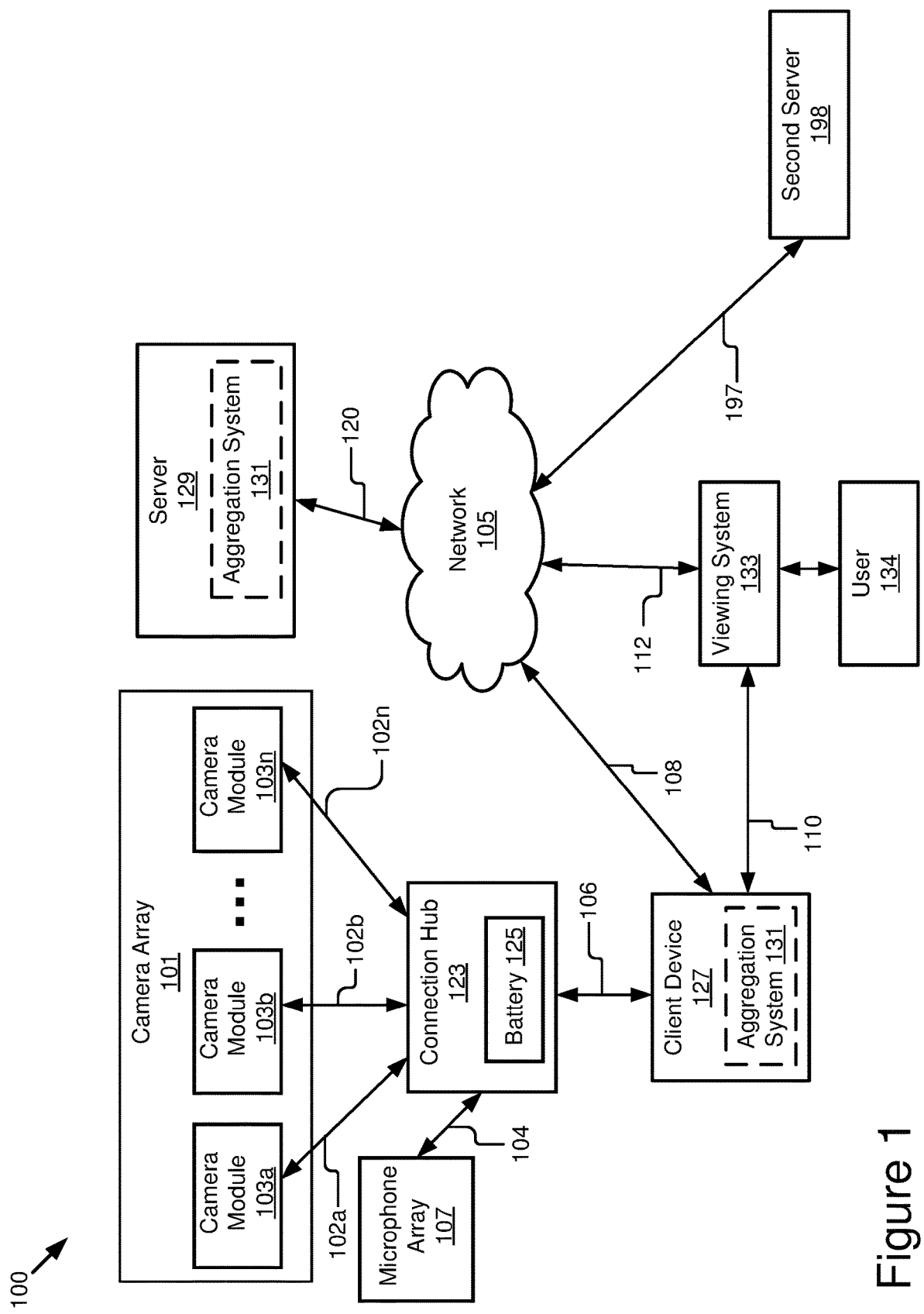
FIG. 1 illustrates a block diagram of some implementations of an example system that collects and aggregates image frames and audio data to generate VR content.

This disclosure is not limited in application to VR. In some embodiments, this disclosure applies to augmented reality (AR) or cross reality (XR) applications as well. Accordingly, every instance in this disclosure where the term "VR" is used may be replaced by the term "AR" or "XR."

A VR experience may include one that creates a realistic sense of being in another place. Creating such an experience may involve reproducing three-dimensional ("3-D") video and optionally 3-D audio for a scene. For example, imagine a user is standing in a forest with a canopy of tree limbs overhead. The user may see trees, rocks, and other objects in various directions. As the user rotates his or her head from side to side and/or up and down, disparity (e.g., shifts in position) of the objects provides the user with depth perception, e.g., the ability to generally perceive the distance to an object in the field of view and/or the distance between objects in the field of view. The user may sense that there is a creek or river behind him or her because the user may hear running water. As the user tilts his or her head to the side, the user's view of the creek or river changes and the sound of the water changes. The creek or river may be easier to see and/or the sound of the water may become more distinct and clearer, and the user has a better sense of how far the water is from the user and how fast the water is flowing. In the canopy of tree limbs above the user, a bird is singing. When the user tilts his or her head upward, the user's senses detect changes in the surrounding environment: the user may see the canopy; the user may see a bluebird singing; the user may have a sense of how far away the bird is based on disparity; and the user may hear the bird's singing more distinctly and loudly since the user is now facing the bird. The user tilts his or her head back to a forward-facing position and now the user may be facing a deer that is standing just 10 feet away from the user. The deer starts to run toward the user and the user's depth perception indicates that the deer is getting closer to the user. Based on the user's depth perception and the relative position of objects around the deer, the user may tell that the deer is running toward him or her at a fast pace.

Current VR solutions may fail to realistically recreate the scene described in the preceding paragraph from the video produced by multiple spatially-separated cameras. For example, 3D video is needed to have depth perception that indicates the deer is running toward the user and running at a certain pace. 3D audio may augment the 3D video. For example, 3D audio may allow the user to hear a change in the water as the user tilts his or her head from side to side, or to hear the bird's song differently as the user tilts his or her head upward. Since existing solutions do not create 3D video as described herein and/or do not combine 3D video with 3D audio, they are unable to realistically recreate the scene described in the preceding paragraph.

The present disclosure relates to creating a realistic sense of being in another place by providing an immersive 3D viewing experience that may optionally be combined with immersive 3D audio listening experience.

In some implementations, a system described herein may include a camera array, a microphone array, an aggregation system, a viewing system, and other devices, systems, or servers. The system is applicable for recording and presenting any event including, but not limited to, a concert, a sports game, a wedding, a press conference, a movie, a promotion event, a video conference, or other event or scene that may be recorded by the camera array and the microphone array. The recording of the event or scene may be viewed through a VR display (e.g., a pair of VR goggles) during occurrence of the event or thereafter.

Camera modules included in the camera array may have lenses mounted around a spherical housing and oriented in different directions with a sufficient diameter and field of view, so that sufficient view disparity may be captured by the camera array for rendering stereoscopic images. The camera array may output raw video data describing image frames with different viewing directions to the aggregation system.

The microphone array is capable of capturing sounds from various directions. The microphone array may output the captured sounds and related directionalities to the aggregation system, which allows the aggregation system to reconstruct sounds from any arbitrary direction.

The aggregation system may aggregate raw video data outputted from the camera array and raw audio data outputted from the microphone array for processing and storage. In some implementations, the aggregation system may include a set of Gigabit Ethernet switches for collecting the raw video data and an audio interface for collecting the raw audio data. Both of the raw video data and audio data may be fed into a client device or a server with a storage device for storing the raw video data and audio data.

The aggregation system may include code and routines stored on a non-transitory memory for processing the raw video data and audio data received across multiple recording devices and for converting the raw video data and audio data into a single compressed stream of 3D video and audio data. For example, the aggregation system may include code and routines that, when executed by a processor, stitch the image frames from multiple camera modules into two panoramic 3D video streams for left and right eye viewing, such as a stream of left panoramic images for left eye viewing (also referred to as a left stream of panoramic images) and a stream of right panoramic images for right eye viewing (also referred to as a right stream of panoramic images). The streams of left and right panoramic images are configured to create a time-varying panorama viewed by a user using the viewing system.

In some implementations, the aggregation system may construct a stereoscopic panorama using image frames from multiple views each in a different direction. For example, the camera array includes multiple camera modules arranged around all 360 degrees of a sphere. The camera modules each have a lens pointing in a different direction. Because the camera modules are arranged around 360 degrees of a sphere and taking images of the scene from multiple viewpoints, the images captured by the camera modules at a particular time include multiple views of the scene from different directions. The resulting left or right panoramic image for the particular time includes a spherical representation of the scene at the particular time. Each pixel in the left or right panoramic image may represent a view of the scene in a slightly different direction relative to neighboring pixels.

In some implementations, the aggregation system generates, based on a left camera map, the stream of left panoramic images for left eye viewing from image frames captured by the camera array. The left camera map identifies a corresponding matching camera module for each pixel in a left panoramic image. A pixel in a panoramic image may correspond to a point in a panoramic scene, and a matching camera module for the pixel in the panoramic image may be a camera module that has a lens with a better view for the point than other camera modules. The left camera map may map pixels in a left panoramic image to corresponding matching camera modules. Similarly, the aggregation system generates, based on a right camera map, the stream of right panoramic images for right eye viewing from image frames captured by the camera array. The right camera map identifies a corresponding matching camera module for each pixel in a right panoramic image. The right camera map may map pixels in a right panoramic image to corresponding matching camera modules.

The aggregation system may also include code and routines that, when executed by a processor, correct camera calibration errors, exposure or color deficiencies, stitching artifacts, and other errors on the left and right panoramic images.

The aggregation system may also add four-channel ambisonic audio tracks to the 3D video streams, and may encode and compress the 3D video and audio streams using a standard moving picture experts group (MPEG) format or other suitable encoding/compression format.

In some implementations, the aggregation system includes code and routines configured to filter the 3D video data to improve its quality. The aggregation system may also include code and routines for intentionally changing the appearance of the video with a video effect. In some implementations, the aggregation system includes code and routines configured to determine an area of interest in a video for a user and to enhance the audio corresponding to the area of interest in the video.

The viewing system decodes and renders the 3D video and audio streams received from the aggregation system on a VR display device (e.g., Oculus Rift VR display or other suitable VR display) and audio reproduction devices (e.g., headphones or other suitable speakers). The VR display device may display left and right panoramic images for the user to provide a 3D immersive viewing experience. The viewing system may include the VR display device that tracks the movement of a user's head. The viewing system may also include code and routines for processing and adjusting the 3D video data and audio data based on the user's head movement to present the user with a 3D immersive viewing experience, which allows the user to view the event or scene in any direction. Optionally, 3D audio may also be provided to augment the 3D viewing experience.

Implementations of the present disclosure will be explained with reference to the accompanying drawings.

FIG. 1 illustrates a block diagram of some implementations of an example system 100 that collects and aggregates image frames and audio data to generate VR content, arranged in accordance with at least some implementations described herein. The illustrated system 100 includes a camera array 101, a connection hub 123, a microphone array 107, a client device 127, and a viewing system 133. In some implementations, the system 100 additionally includes a server 129 and a second server 198. The client device 127, the viewing system 133, the server 129, and the second server 198 may be communicatively coupled via a network 105.

The separation of various components and servers in the implementations described herein should not be understood as requiring such separation in all implementations, and it should be understood that the described components and servers may generally be integrated together in a single component or server. Additions, modifications, or omissions may be made to the illustrated implementation without departing from the scope of the present disclosure, as will be appreciated in view of the present disclosure.

While FIG. 1 illustrates one camera array 101, one connection hub 123, one microphone array 107, one client device 127, one server 129, and one second server 198, the present disclosure applies to a system architecture having one or more camera arrays 101, one or more connection hubs 123, one or more microphone arrays 107, one or more client devices 127, one or more servers 129, one or more second servers 198, and one or more viewing systems 133. Furthermore, although FIG. 1 illustrates one network 105 coupled to the entities of the system 100, in practice one or more networks 105 may be connected to these entities and the one or more networks 105 may be of various and different types.

The camera array 101 may be a modular camera system configured to capture raw video data that includes image frames. In the illustrated implementation shown in FIG. 1, the camera array 101 includes camera modules 103*a*, 103*b* . . . 103*n* (also referred to individually and collectively herein as camera module 103). While three camera modules 103*a*, 103*b*, 103*n* are illustrated in FIG. 1, the camera array 101 may include any number of camera modules 103. The camera array 101 may be constructed using individual cameras with each camera module 103 including one individual camera. In some implementations, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, the camera modules 103*a*, 103*b* . . . 103*n* in the camera array 101 may be configured in different geometries (e.g., a sphere, a line, a cylinder, a cone, and a cubic, etc.) with the corresponding lenses in the camera modules 103a, 103b . . . 103n facing toward different directions. The camera array 101 has a flexible structure so that a particular camera module 103 may be removed from the camera array 101 and new camera modules 103 may be added to the camera array 101.

In some implementations, the camera modules 103a, 103b . . . 103n in the camera array 101 may be oriented around a sphere in different directions with sufficient diameter and field of view to capture sufficient view disparity to render stereoscopic images. For example, the camera array 101 may include 32 Point Grey Blackfly Gigabit Ethernet cameras distributed around a 20-centimeter diameter sphere. Camera models that are different from the Point Grey Blackfly camera model may be included in the camera array 101. For example, in some implementations the camera array 101 may include a sphere whose exterior surface is covered in one or more optical sensors configured to render 3D images or video. The optical sensors may be communicatively coupled to a controller. The entire exterior surface of the sphere may be covered in optical sensors configured to render 3D images or video.

In some implementations, the camera modules 103 in the camera array 101 are configured to have a sufficient field-of-view overlap so that all objects can be seen from more than one view point. For example, the horizontal field of view for each camera module 103 included in the camera array 101 is 70 degrees. In some implementations, having the camera array 101 configured in such a way that an object may be viewed by more than one camera module 103 is beneficial for correcting exposure or color deficiencies in the images captured by the camera array 101.

The camera modules 103 in the camera array 101 may or may not include built-in batteries. The camera modules 103 may obtain power from a battery coupled to the connection hub 123. In some implementations, the external cases of the camera modules 103 may be made of heat-transferring materials such as metal so that the heat in the camera modules 103 may be dissipated more quickly than using other materials. In some implementations, each camera module 103 may include a heat dissipation element. Examples of heat dissipation elements include, but are not limited to, heat sinks, fans, and heat-dissipating putty.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some implementations, the camera modules 103a, 103b . . . 103n in the camera array 101 may form a daisy chain in which the camera modules 103a, 103b . . . 103n are connected in sequence. The camera modules 103a, 103b . . . 103n in the camera array 101 may be synchronized through the daisy chain. One camera module (e.g., the camera module 103a) in the daisy chain may be configured as a master camera module that controls clock signals for other camera modules in the camera array 101. The clock signals may be used to synchronize operations (e.g., start operations, stop operations) of the camera modules 103 in the camera array 101. Through the synchronized start and stop operations of the camera modules 103, the image frames in the respective video data captured by the respective camera modules 103a, 103b . . . 103n are also synchronized.

Example implementations of the camera array 101 and the camera modules 103 are described in U.S. application Ser. No. 14/444,938, titled "Camera Array Including Camera Modules", filed Jul. 28, 2014, which is herein incorporated in its entirety by reference.

The camera modules 103 may be coupled to the connection hub 123. For example, the camera module 103a is communicatively coupled to the connection hub 123 via a signal line 102a, the camera module 103b is communicatively coupled to the connection hub 123 via a signal line 102b, and the camera module 103n is communicatively coupled to the connection hub 123 via a signal line 102n. In some implementations, a signal line in the disclosure may represent a wired connection or any combination of wired connections such as connections using Ethernet cables, high-definition multimedia interface (HDMI) cables, universal serial bus (USB) cables, RCA cables, Firewire, Camera-Link, or any other signal line suitable for transmitting video data and audio data. Alternatively, a signal line in the disclosure may represent a wireless connection such as a wireless fidelity (Wi-Fi) connection or a BLUETOOTH® connection.

The microphone array 107 may include one or more microphones configured to capture sounds from different directions in an environment. In some implementations, the microphone array 107 may include one or more processors and one or more memories. The microphone array 107 may include a heat dissipation element. In the illustrated implementation, the microphone array 107 is coupled to the connection hub 123 via a signal line 104. Alternatively or additionally, the microphone array 107 may be directly coupled to other entities of the system 100 such as the client device 127.

The microphone array 107 may capture sound from various directions. The sound may be stored as raw audio data on a non-transitory memory communicatively coupled to the microphone array 107. The microphone array 107 may detect directionality of the sound. The directionality of the sound may be encoded and stored as part of the raw audio data.

In some implementations, the microphone array 107 may include a Core Sound Tetramic soundfield tetrahedral microphone array following the principles of ambisonics, enabling reconstruction of sound from any arbitrary direction. For example, the microphone array 107 may include an ambisonics microphone mounted on top of the camera array 101 and used to record sound and sonic directionality. In some implementations, the microphone array 107 includes a Joseph Grado HMP-1 recording system, or any other microphone system configured according to the same or similar acoustical principles.

In some implementations, the camera modules 103 may be mounted around a camera housing (e.g., a spherical housing or a housing with another suitable shape). The microphone array 107 may include multiple microphones mounted around the same camera housing, with each microphone located in a different position. The camera housing may act as a proxy for the head-shadow sound-blocking properties of a human head. As described below with reference to FIG. 2, during playback of the recorded audio data, an audio module 212 may select an audio track for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the client device 127 for processing and storage. The connection hub 123 may also receive and aggregate streams of raw video data describing image frames captured by the respective camera modules 103. The connection hub 123 may then transfer the raw video data to the client device 127 for processing and storage. The connection hub 123 is communicatively coupled to the client device 127 via a signal line 106. In some examples, the connection hub 123 may be a USB hub. In some implementations, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television, or any other processor based computing device. In some implementations, the client device 127 includes network functionality and is communicatively coupled to the network 105 via a signal line 108. The client device 127 may be configured to transmit data to the server 129 or to receive data from the server 129 via the network 105.

The client device 127 may receive raw video data and raw audio data from the connection hub 123. In some implementations, the client device 127 may store the raw video data and raw audio data locally in a storage device associated with the client device 127. Alternatively, the client device 127 may send the raw video data and raw audio data to the server 129 via the network 105 and may store the raw video data and the audio data on a storage device associated with the server 129. In some implementations, the client device 127 includes an aggregation system 131 for aggregating raw video data captured by the camera modules 103 to form 3D video data and aggregating raw audio data captured by the microphone array 107 to form 3D audio data. Alternatively or additionally, the aggregation system 131 may be operable on the server 129.

The aggregation system 131 may include a system configured to aggregate raw video data and raw audio data to generate a stream of 3D video data and a stream of 3D audio data, respectively. The aggregation system 131 may be stored on a single device or a combination of devices of FIG. 1. In some implementations, the aggregation system 131 can be implemented using hardware including a field-programmable gate array ("FPGA") or an application-specific integrated circuit ("ASIC"). In some other implementations, the aggregation system 131 may be implemented using a combination of hardware and software. The aggregation system 131 is described below in more detail with reference to FIGS. 2-5.

The viewing system 133 may include or use a computing device to decode and render a stream of 3D video data on a VR display device (e.g., Oculus Rift VR display) or other suitable display devices that include, but are not limited to: augmented reality glasses; televisions, smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include the VR display configured to render the 3D video data and the audio reproduction device configured to render the 3D audio data. The viewing system 133 may be coupled to the client device 127 via a signal line 110 and the network 105 via a signal line 112. A user 134 may interact with the viewing system 133.

In some implementations, the viewing system 133 may receive VR content from the client device 127. Alternatively or additionally, the viewing system 133 may receive the VR content from the server 129. The viewing system 133 may also be coupled to the aggregation system 131 and may receive the VR content from the aggregation system 131. The VR content may include one or more of a stream of 3D video data, a stream of 3D audio data, a compressed stream of 3D video data, a compressed stream of 3D audio data, and other suitable content.

The viewing system 133 may track a head orientation of a user. For example, the viewing system 133 may include one or more accelerometers or gyroscopes used to detect a change in the user's head orientation. The viewing system 133 may decode and render the stream of 3D video data on a VR display device and the stream of 3D audio data on a speaker system based on the head orientation of the user. As the user changes his or her head orientation, the viewing system 133 may adjust the rendering of the 3D video data and 3D audio data based on the changes of the user's head orientation.

The viewing system 133 may provide an immersive viewing experience to the user 134. For example, the viewing system 133 may include a VR display device that has a wide field of view so that the user 134 viewing the VR content feels like he or she is surrounded by the VR content in a manner similar to in a real-life environment. A complete 360-degree view of the scene is provided to the user 134, and the user 134 may view the scene in any direction. As the user 134 moves his or her head, the view is modified to match what the user 134 would see as if he or she was moving his or her head in the real world. By providing a different view to each eye (e.g., a stream of left panoramic images for left eye viewing and a stream of right panoramic images for right eye viewing), which simulates what the left and right eyes may see in the real world, the viewing system 133 may give the user 134 a 3D view of the scene. Additionally, 3D surrounding sound may be provided to the user 134 based on the user's head orientation to augment the immersive 3D viewing experience. For example, if a character in an immersive movie is currently behind the user 134, the character's voice may appear to be emanating from behind the user 134.

In some implementations, the viewing system 133 may allow the user 134 to adjust the left panoramic images and the right panoramic images to conform to the user's interpupillary distance. The left panoramic images and the right panoramic images may move further apart for users with larger interpupillary distances or may move closer for users with smaller interpupillary distances.

In some implementations, the viewing system 133 includes a peripheral device such as a microphone, camera, mouse, or keyboard that is configured to enable the user 134 to provide an input to one or more components of the system 100. For example, the user 134 may interact with the peripheral device to provide a status update to the social network service provided by the social network server 135. In some implementations, the peripheral device includes a camera such as the Microsoft® Kinect or another similar device, which allows the user 134 to provide gesture inputs to the viewing system 133 or other entities of the system 100.

In some implementations, multiple viewing systems 133 may receive and consume the VR content streamed by the aggregation system 131. In other words, two or more viewing systems 133 may be communicatively coupled to the aggregation system 131 and configured to simultaneously or contemporaneously receive and consume the VR content generated by the aggregation system 131.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include BLUETOOTH® communication networks or a cellular communication network for sending and receiving data including via short messaging service (SMS), multimedia messaging service (MMS), hypertext transfer protocol (HTTP), direct data connection, WAP, e-mail, etc.

The server 129 may be a hardware server that includes a processor, a memory, and network communication capabilities. In the illustrated implementation, the server 129 is coupled to the network 105 via a signal line 120. The server 129 sends and receives data to and from one or more of the other entities of the system 100 via the network 105. For example, the server 129 receives VR content including a stream of 3D video data (or compressed 3D video data) and a stream of 3D audio data (or compressed 3D audio data) from the client device 127 and stores the VR content on a storage device associated with the server 129. Alternatively, the server 129 includes the aggregation system 131 that receives raw video data and raw audio data from the client device 127 and aggregates the raw video data and raw audio data to generate the VR content. The viewing system 133 may access the VR content from the server 129 or the client device 127.

The second server 198 may be a hardware server that includes a processor, a memory, and network communication capabilities. In the illustrated implementation, the second server 198 is coupled to the network 105 via a signal line 197. The second server 198 sends and receives data to and from one or more of the other entities of the system 100 via the network 105. The second server 198 may provide computer-generated imagery to the aggregation system 131 for insertion into the stream so that live and computer-generated images may be combined. In other implementations, the second server 198 provides audio tracks that may be provided to the aggregation system 131 for insertion into the stream so that live content includes an audio track. For example, the audio track is a soundtrack.

In some implementations, the second server 198 includes functionality to modify the video or audio provided to the aggregation system 131. For example, the second server 198 includes code and routines executed by a processor and configured to provide noise cancellation of audio, reverberation effects for audio, insertion of video effects, etc. Accordingly, the second server 198 may be configured to enhance or transform video and audio associated with the aggregation system 131.

In some implementations, the system 100 includes two or more camera arrays 101 and two or more microphone arrays 107, and a user may switch between two or more viewpoints of the two or more camera arrays 101. For example, the system 100 may be used to record a live event such as a baseball game. The user may use the viewing system 133 to watch the baseball game from a first view point associated with a first camera array 101. A play is developing on the field and the user may want to switch viewpoints to have a better vantage of the play. The user provides an input to the aggregation system 131 via the viewing system 133, and the aggregation system 131 may switch to a second camera array 101 which provides a better vantage of the play. The second camera array 101 may be associated with a different microphone array 107 which provides different sound to the user specific to the user's new vantage point.

Figure 2:
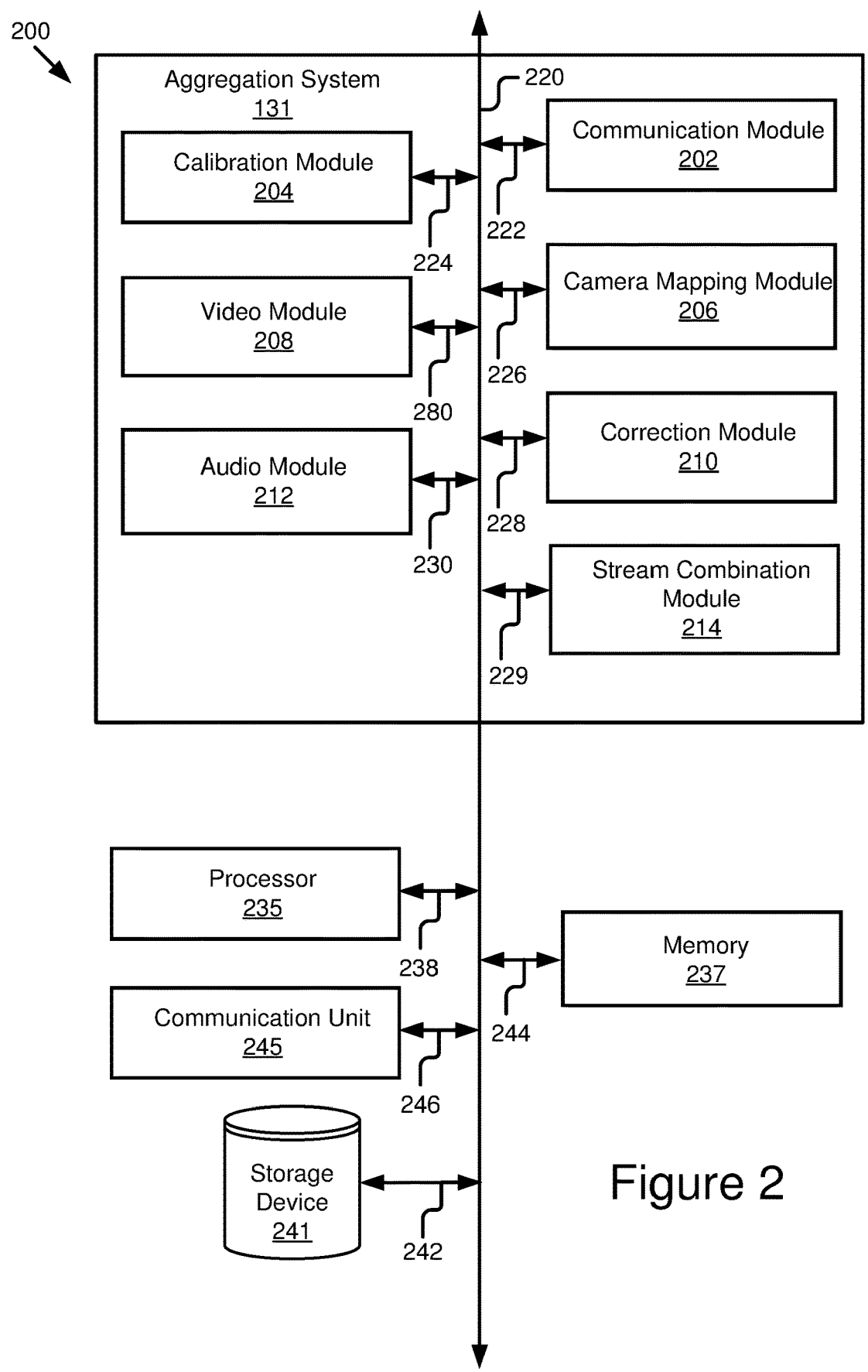
FIG. 2 illustrates a block diagram of some implementations of a computing device that includes an example aggregation system.

Referring now to FIG. 2, an example of the aggregation system 131 is illustrated in accordance with at least some implementations described herein. FIG. 2 is a block diagram of a computing device 200 that includes the aggregation system 131, a memory 237, a processor 235, a storage device 241, and a communication unit 245. In the illustrated implementation, the components of the computing device 200 are communicatively coupled by a bus 220. In some implementations, the computing device 200 may be a personal computer, smartphone, tablet computer, set top box, or any other processor-based computing device. The computing device 200 may be one of the client device 127, the server 129, and another device in the system 100 of FIG. 1.

The processor 235 may include an arithmetic logic unit, a microprocessor, a general-purpose controller, or some other processor array to perform computations and provide electronic display signals to a display device. The processor 235 is coupled to the bus 220 for communication with the other components via a signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 includes a non-transitory memory that stores data for providing the functionality described herein. The memory 237 may be a dynamic random access memory (DRAM) device, a static random access memory (SRAM) device, flash memory, or some other memory devices. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines, and data for the aggregation system 131 to provide its functionality. The memory 237 is coupled to the bus 220 via a signal line 244.

The communication unit 245 may transmit data to any of the entities of the system 100 depicted in FIG. 1. Similarly, the communication unit 245 may receive data from any of the entities of the system 100 depicted in FIG. 1. The communication unit 245 may include one or more Ethernet switches for receiving the raw video data and the raw audio data from the connection hub 123. The communication unit 245 is coupled to the bus 220 via a signal line 246. In some implementations, the communication unit 245 includes a port for direct physical connection to a network, such as the network 105 of FIG. 1, or to another communication channel. For example, the communication unit 245 may include a port such as a USB, SD, RJ45, or similar port for wired communication with another computing device. In some implementations, the communication unit 245 includes a wireless transceiver for exchanging data with another computing device or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to a network for distribution of data using standard network protocols including TCP/IP, HTTP, HTTPS, and SMTP, etc.

The storage device 241 may be a non-transitory storage medium that stores data for providing the functionality described herein. The storage device 241 may be a dynamic random access memory (DRAM) device, a static random access memory (SRAM) device, flash memory, or some other memory devices. In some implementations, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242.

In the implementation illustrated in FIG. 2, the aggregation system 131 includes a communication module 202, a calibration module 204, a camera mapping module 206, a video module 208, a correction module 210, the audio module 212, and a stream combination module 214. These modules of the aggregation system 131 are communicatively coupled to each other via the bus 220.

In some implementations, each module of the aggregation system 131 (e.g., modules 202, 204, 206, 208, 210, 212, or 214) may include a respective set of instructions executable by the processor 235 to provide its respective functionality described below. In some implementations, each module of the aggregation system 131 may be stored in the memory 237 of the computing device 200 and may be accessible and executable by the processor 235. Each module of the aggregation system 131 may be adapted for cooperation and communication with the processor 235 and other components of the computing device 200.

The communication module 202 may be software including routines for handling communications between the aggregation system 131 and other components of the computing device 200. The communication module 202 may be communicatively coupled to the bus 220 via a signal line 222. The communication module 202 sends and receives data, via the communication unit 245, to and from one or more of the entities of the system 100 depicted in FIG. 1. For example, the communication module 202 may receive raw video data from the connection hub 123 via the communication unit 245 and may forward the raw video data to the video module 208. In another example, the communication module 202 may receive VR content from the stream combination module 214 and may send the VR content to the viewing system 133 via the communication unit 245.

In some implementations, the communication module 202 receives data from components of the aggregation system 131 and stores the data in the memory 237 or the storage device 241. For example, the communication module 202 receives VR content from the stream combination module 214 and stores the VR content in the memory 237 or the storage device 241. In some implementations, the communication module 202 retrieves data from the memory 237 or the storage device 241 and sends the data to one or more appropriate components of the aggregation system 131. Alternatively or additionally, the communication module 202 may also handle communications between components of the aggregation system 131.

The calibration module 204 may be software including routines for calibrating the camera modules 103 in the camera array 101. The calibration module 204 may be adapted for cooperation and communication with the processor 235 and other components of the computing device 200 via a signal line 224.

In some implementations, lenses included in the camera modules 103 may have some amount of spherical distortion. Images captured with the camera modules 103 may have a barrel distortion or a pin-cushion distortion that needs to be corrected during creation of panoramic images from the distorted images. The barrel distortion may be referred to as a "fish eye effect." For each camera module 103, the calibration module 204 calibrates a lens in the corresponding camera module 103 to determine associated distortion caused by the lens. For example, a snapshot of a test pattern that has known geometries placed in a known location (e.g., a checkerboard in a known location) may be captured by the camera module 103. The calibration module 204 may determine properties of a lens included in the camera module 103 from the snapshot of the test pattern. Properties of a lens may include, but are not limited to, distortion parameters, an optical center, and other optical properties associated with the lens.

The calibration module 204 stores data describing the properties of each lens in a configuration file. The configuration file may include data describing properties of all lenses of all the camera modules 103 in the camera array 101. For example, the configuration file includes data describing distortion parameters, an optical center, and other optical properties for each lens in the camera array 101.

Alternatively or additionally, the calibration module 204 may perform multi-camera geometric calibration on the camera array 101 to determine variations in the physical properties of the camera array 101. For example, the calibration module 204 may determine slight variations in camera orientation for each lens in the camera array 101, where the slight variations in the camera orientation may be caused by human errors occurring during an installation or manufacture process of the camera array 101. In another example, the calibration module 204 may estimate errors in the predicted roll, pitch, and yaw of a corresponding lens in each camera module 103. The calibration module 204 may determine a position and a rotational offset for the corresponding lens in each camera module 103 and may store the position and the rotational offset for the corresponding lens in the configuration file. As a result, the relative position of each two lenses in the camera array 101 may be determined based on the positions and rotational offsets of the two corresponding lenses. For example, spatial transformation between each two lenses may be determined based on the positions and rotational offsets of the two corresponding lenses.

The camera mapping module 206 may be software including routines for constructing a left camera map and a right camera map. The camera mapping module 206 may be adapted for cooperation and communication with the processor 235 and other components of the computing device 200 via a signal line 226.

Figure 6A:
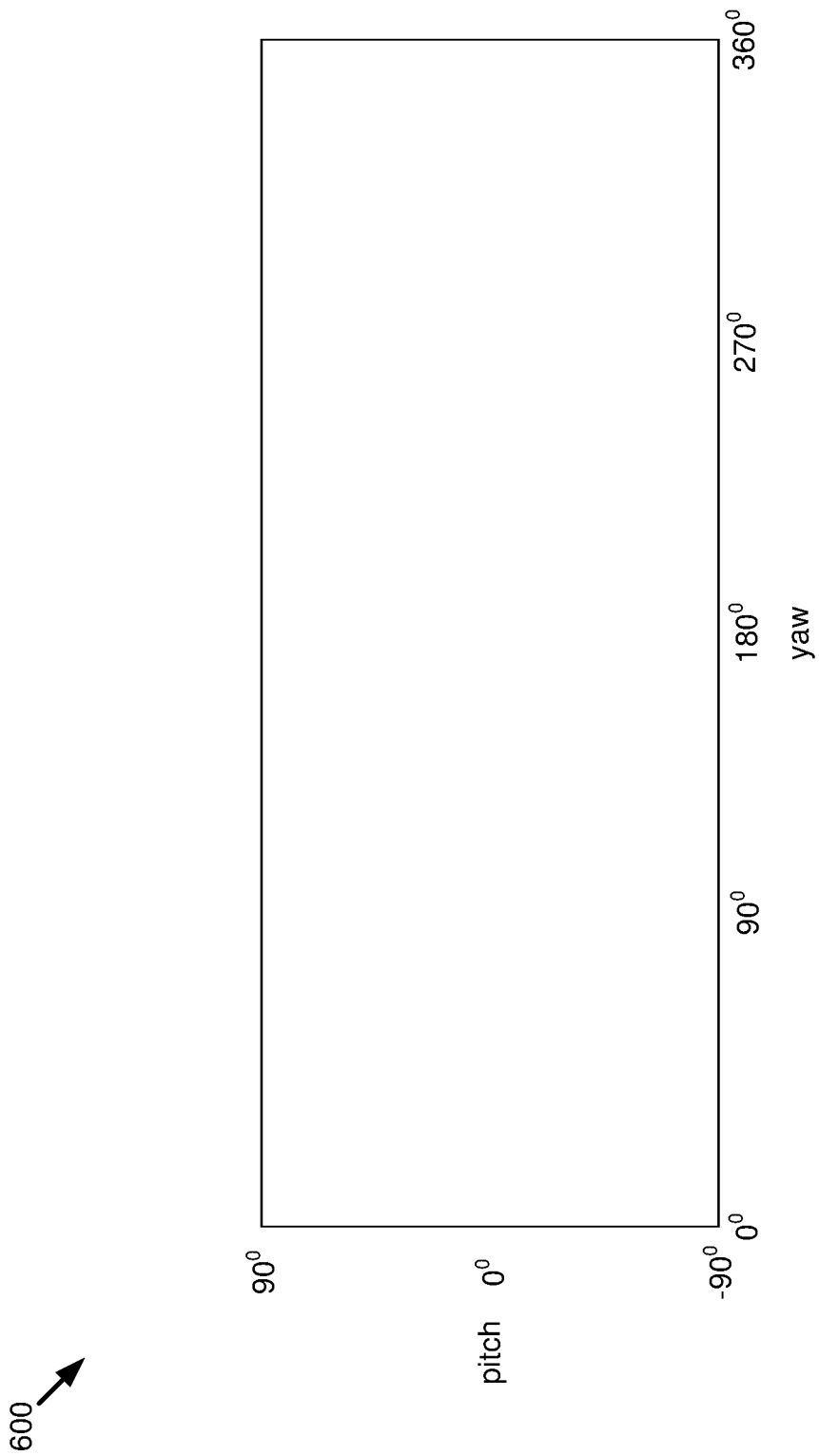
FIG. 6A is a graphic representation that illustrates an example panoramic image.

A two-dimensional (2D) spherical panoramic image may be used to represent a panorama of an entire scene. As described below with reference to the video module 208, two stereoscopic panorama images may be generated for two eyes to provide a stereoscopic view of the entire scene. For example, a left panoramic image may be generated for the left eye viewing and a right panoramic image may be generated for the right eye viewing. An example panoramic image is illustrated in FIG. 6A.

A pixel in a panoramic image may be presented by a yaw value and a pitch value. Yaw represents rotation around the center and may be represented on the horizontal x-axis as:

$$yaw = 360° \times x / width. \quad (1)$$

Yaw has a value between 0° and 360°. Pitch represents up or down rotation and may be represented on the vertical y-axis as:

$$pitch = 90° \times (height/2 - y) / (height/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw∈[0°,360°] and pitch=0° in a left panoramic image may represent an eye viewing position of the left eye as the head is rotated to the position indicated by the yaw value and the pitch value. Similarly, a pixel at the position with yaw∈[0°,360°] and pitch=0° in a right panoramic image represents an eye viewing position of the right eye as the head is rotated to the position indicated by the yaw value and the pitch value. For pitch=0° (e.g., no up and down rotations), as the head is rotated from yaw=0° to yaw=360°, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). As a user tilts his or her head upwards or downwards (e.g., pitch≠0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos (pitch). The interocular distance may be adjusted based on the adjustment function f(pitch). For example, the interocular distance associated with the pitch may be adjusted as:

$$interocular\ distance = max(interocular\ distance) \times f(pitch), \quad (3)$$

where max(interocular distance) represents the maximum value of the interocular distance (e.g., the interocular distance is at its maximum when pitch=$0_0$). If f(pitch)=cos (pitch), then the interocular distance may be expressed as:

$$interocular\ distance = max(interocular\ distance) \times \cos(pitch). \quad (4)$$

In some examples, the maximum value of the interocular distance may be about 60 millimeters. In other examples, the maximum value of the interocular distance may have a value greater than 60 millimeters or less than 60 millimeters.

The camera mapping module 206 may construct a left camera map that identifies a corresponding matching camera module 103 for each pixel in a left panoramic image. For example, for a pixel in a left panoramic image that represents a point in a panorama, the left camera map may identify a matching camera module 103 that has a best view for the point in the panorama compared to other camera modules 103. Thus, the left camera map may map pixels in a left panoramic image to matching camera modules 103 that have best views for the corresponding pixels. Determination of a matching camera module 103 for a pixel is described below in more detail.

An example camera map is illustrated with reference to FIG. 6B. A camera map may include a left camera map or a right camera map. A camera map may use (yaw, pitch) as an input and may generate an output of (an identifier of a matching camera module, x, y), indicating a pixel (yaw, pitch) in a panoramic image may be obtained as a pixel (x, y) in an image plane of the identified matching camera module. The camera map may store the output (an identifier of a matching camera module, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. For example, referring to FIG. 7A, a distance for a point 716 may refer to a distance from the point 716 to a center of the camera array 101. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the left eye (e.g., a left viewing direction) to the corresponding point in the panorama.

In some implementations, a matching camera module 103 for a pixel in a left panoramic image that has a better view of the pixel may have a viewing direction to a point in a panorama that corresponds to the pixel in the left panoramic image. The viewing direction of the matching camera module 103 is closer to the left viewing direction than other viewing directions of other camera modules 103 to the same point in the panorama. For example, referring to FIG. 7A, the viewing direction 714 of the matching camera module 103a is more parallel to a left viewing direction 704 than other viewing directions of other camera modules 103. In other words, for each pixel in the left panoramic image, the left camera map may identify a corresponding matching camera module 103 that has a viewing direction most parallel to the left viewing direction than other viewing directions of other camera modules 103. Illustrations of a matching camera module 103 with a more parallel viewing direction to a left viewing direction are illustrated with reference to FIGS. 7A and 7B.

Similarly, the camera mapping module 206 may construct a right camera map that identifies a corresponding matching camera module 103 for each pixel in a right panoramic image. For example, for a pixel in a right panoramic image that represents a point in a panorama, the right camera map may identify a matching camera module 103 that has a better view for the point in the panorama than other camera modules 103. Thus, the right camera map may map pixels in a right panoramic image to matching camera modules 103 that have better views for the corresponding pixels.

For each pixel in a right panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the right eye (e.g., a right viewing direction) to the corresponding point in the panorama.

In some implementations, a matching camera module 103 for a pixel in a right panoramic image that has a better view of the pixel may have a viewing direction to a point in a panorama that corresponds to the pixel in the right panoramic image. The viewing direction of the matching camera module 103 is closer to the right viewing direction than other viewing directions of other camera modules 103 to the same point in the panorama. For example, the viewing direction of the matching camera module 103 is more parallel to the right viewing direction than other viewing directions of other camera modules 103. In other words, for each pixel in the right panoramic image, the right camera map may identify a corresponding matching camera module 103 that has a viewing direction most parallel to the right viewing direction than other viewing directions of other camera modules 103.

Since the physical configuration of the camera array 101 is fixed, the left and right camera maps are the same for different left panoramic images and right panoramic images, respectively. The left and right camera maps may be pre-computed and stored to achieve a faster processing speed compared to an on-the-fly computation.

The video module 208 may be software including routines for generating a stream of 3D video data configured to render 3D video when played back on a VR display device. The video module 208 may be adapted for cooperation and communication with the processor 235 and other components of the computing device 200 via a signal line 280. The stream of 3D video data may describe a stereoscopic panorama of a scene that may vary over time. The stream of 3D video data may include a stream of left panoramic images for left eye viewing and a stream of right panoramic images for right eye viewing.

In some implementations, the video module 208 receives raw video data describing image frames from the various camera modules 103 in the camera array 101. The video module 208 identifies a location and timing associated with each of the camera modules 103 and synchronizes the image frames based on locations and timings of the camera modules 103. The video module 208 synchronizes corresponding image frames that are captured by different camera modules 103 at the same time.

For example, the video module 208 receives a first stream of image frames from a first camera module 103 and a second stream of image frames from a second camera module 103. The video module 208 identifies that the first camera module 103 is located at a position with yaw=$0°$ and pitch=$0°$ and the second camera module 103 is located at a position with yaw=$30°$ and pitch=$0°$. The video module 208 synchronizes the first stream of image frames with the second stream of image frames by associating a first image frame from the first stream captured at a first particular time T=$T_0$ with a second image frame from the second stream captured at the same particular time T=$T_0$, a third image frame from the first stream captured at a second particular time T=$T_1$ with a fourth image frame from the second stream captured at the same particular time T=$T_1$, and so on and so forth.

In some implementations, the video module 208 sends the synchronized image frames to the correction module 210 so that the correction module 210 may correct calibration errors in the synchronized image frames. For example, the correction module 210 may correct lens distortion, orientation errors, and rotation errors, etc., in the image frames. The correction module 210 may send the image frames back to the video module 208 after correcting the calibration errors.

The video module 208 may receive a left camera map and a right camera map from the camera mapping module 206. Alternatively, the video module 208 may retrieve the left and right camera maps from the storage device 241 or the memory 237. The video module 208 may construct a stream of left panoramic images from the image frames based on the left camera map. For example, the video module 208 identifies matching camera modules 103 listed in the left camera map. The video module 208 constructs a first left panoramic image $PI_{L,0}$ by stitching image frames that are captured by the matching camera modules 103 at a first particular time T=$T_0$. The video module 208 constructs a second left panoramic image $PI_{L,1}$ by stitching image frames that are captured by the matching camera modules 103 at a second particular time T=$T_1$, and so on and so forth. The video module 208 constructs the stream of left panoramic images to include the first left panoramic image $PI_{L,0}$, the second left panoramic image $PI_{L,1}$, and other constructed left panoramic images.

Specifically, for a pixel in a left panoramic image $PI_{L,i}$, at a particular time T=$T_i$ (i=0, 1, 2, . . . ), the video module 208: (1) identifies a matching camera module 103 from the left camera map; and (2) configures the pixel in the left panoramic image $PI_{L,i}$ to be a corresponding pixel from an image frame that is captured by the matching camera module 103 at the particular time T=$T_i$. The pixel in the left panoramic image $PI_{L,i}$ and the corresponding pixel in the image frame of the matching camera module 103 may correspond to the same point in the panorama. For example, for a pixel location in the left panoramic image $PI_{L,i}$ that corresponds to a point in the panorama, the video module

208: (1) retrieves a pixel that also corresponds to the same point in the panorama from the image frame that is captured by the matching camera module 103 at the particular time $T=T_i$; and (2) places the pixel from the image frame of the matching camera module 103 into the pixel location of the left panoramic image $PI_{L,i}$.

Similarly, the video module 208 constructs a stream of right panoramic images from the image frames based on the right camera map by performing operations similar to those described above with reference to the construction of the stream of left panoramic images. For example, the video module 208 identifies matching camera modules 103 listed in the right camera map. The video module 208 constructs a first right panoramic image $PI_{R,0}$ by stitching image frames that are captured by the matching camera modules 103 at a first particular time $T=T_0$. The video module 208 constructs a second right panoramic image $PI_{R,1}$ by stitching image frames that are captured by the matching camera modules 103 at a second particular time $T=T_1$, and so on and so forth. The video module 208 constructs the stream of right panoramic images to include the first right panoramic image $PI_{R,0}$, the second right panoramic image $PI_{R,1}$, and other constructed right panoramic images.

Specifically, for a pixel in a right panoramic image $PI_{R,i}$ at a particular time $T=T_i$ ($i=0, 1, 2, \ldots$), the video module 208: (1) identifies a matching camera module 103 from the right camera map; and (2) configures the pixel in the right panoramic image $PI_{R,i}$ to be a corresponding pixel from an image frame that is captured by the matching camera module 103 at the particular time $T=T_i$. The pixel in the right panoramic image $PI_{R,i}$ and the corresponding pixel in the image frame of the matching camera module 103 may correspond to the same point in the panorama.

In some implementations, the video module 208 may construct pixels in a left or right panoramic image by blending pixels from image frames of multiple camera modules 103 according to weights associated with the multiple camera modules 103. An example pixel blending process is described below in more detail with reference to FIG. 8.

In some implementations, the left and right panoramic images may be optimized for stereoscopic viewing in a horizontal plane (e.g., yaw$\in[0°, 360°]$ and pitch=$0_0$). Alternatively or additionally, the left and right panoramic images may be optimized based on a user's viewing direction. For example, the video module 208 may adaptively construct the streams of left panoramic images and right panoramic images based on the user's current viewing direction. A panorama provided by the streams of left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some implementations, a constructed left or right panoramic image may have color deficiencies. For example, since the lenses in the camera modules 103 may point to different directions, light and color conditions may vary for the different lenses. Some image frames taken by some camera modules 103 may be over-exposed while some other image frames taken by other camera modules 103 may be under-exposed. The exposure or color deficiencies between image frames from different camera modules 103 may be corrected by the correction module 210 during a construction process of the left or right panoramic image.

Additionally or alternatively, due to the disparity between neighboring camera modules 103, a constructed left or right panoramic image may have stitching artifacts (or, stitching errors) where the viewpoint switches from a camera module 103 to a neighboring camera module 103. Objects that are far away from the camera modules 103 may have negligible disparity and there may be no stitching errors for the far-away objects. However, objects that are near the camera modules 103 may have noticeable disparity and there may be stitching errors for the nearby objects. Correction of the stitching errors is described below in more detail with reference to the correction module 210.

The correction module 210 may be software including routines for correcting aberrations in image frames or panoramic images. The correction module 210 is communicatively coupled to the bus 220 via a signal line 228. The aberrations may include calibration errors, exposure or color deficiencies, stitching artifacts, and other types of aberrations. The stitching artifacts may include errors made by the video module 208 when stitching image frames from various camera modules 103 to form a left or right panoramic image. The correction module 210 may analyze the image frames or the panoramic images to identify the aberrations. The correction module 210 may process the image frames or panoramic images to mask or correct the aberrations. The correction module 210 may automatically correct the aberrations or provide an administrator of the aggregation system 131 with tools or resources to manually correct the aberrations.

In some implementations, the correction module 210 receives image frames captured by a camera module 103 and corrects calibration errors on the image frames. For example, the correction module 210 may correct lens distortion (e.g., barrel or pin-cushion distortion) and camera orientation errors in the image frames based on lens distortion parameters, a position, and a rotational offset associated with the camera module 103.

In another example, the correction module 210 may analyze the image frames captured by the camera module 103, determine the calibration errors present in the image frames, and determine calibration factors used to calibrate the camera module 103. The calibration factors may include data used to automatically modify the image frames captured by the camera module 103 so that the image frames include fewer errors. In some implementations, the calibration factors are applied to the image frames by the correction module 210 so that the image frames include no errors that are detectable during user consumption of the VR content. For example, the correction module 210 may detect the deficiencies in the image frames caused by the calibration errors. The correction module 210 may determine one or more pixels associated with the deficiencies. The correction module 210 may determine the pixel values associated with these pixels and then modify the pixel values using the calibration factors so that the deficiencies are corrected. In some implementations, the calibration factors may also be provided to an administrator of the camera array 101 who uses the calibration factors to manually correct the calibration deficiencies of the camera array 101.

In some implementations, the correction module 210 may detect and correct exposure or color deficiencies in the image frames captured by the camera array 101. For example, the correction module 210 may determine one or more pixels associated with the exposure or color deficiencies. The correction module 210 may determine the pixel values associated with these pixels and then modify the pixel values so that the exposure or color deficiencies are not detectable by the user 134 during consumption of the VR content using the viewing system 133. In some implementations, the camera modules 103 of the camera array 101 have overlapping fields of view, and exposure or color deficiencies in the image frames captured by the camera array 101 may be corrected or auto-corrected using this overlap. In other implementations, exposure or color deficiencies in the image frames captured by the camera array 101 may be corrected using calibration based on color charts of known values.

In some implementations, the correction module 210 may correct stitching errors caused by close-by objects. For example, the closer an object is to the camera array 101, the greater the difference of a viewing angle from each camera module 103 to the object. Close-by objects that cross a stitching boundary may abruptly transition between viewing angles and may thus produce an obvious visual discontinuity. This may be referred to herein as the "close object problem." Stitching artifacts may be incurred for close-by objects. One example mechanism to reduce the stitching errors may include increasing the number of camera modules 103 distributed throughout a spherical housing case of the camera array 101 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed Aug. 21, 2014, now U.S. Pat. No. 9,930,238, issued Mar. 27, 2018, which is incorporated herein in its entirety by reference.

The audio module 212 may be software including routines for generating a stream of 3D audio data configured to render 3D audio when played back on an audio reproduction device. The audio module 212 is communicatively coupled to the bus 220 via a signal line 230. The audio module 212 may generate the 3D audio data based on the raw audio data received from the microphone array 107. In some implementations, the audio module 212 may process the raw audio data to generate four-channel ambisonic audio tracks corresponding to the 3D video data generated by the video module 208. The four-channel ambisonic audio tracks may provide a compelling 3D 360-degree audio experience to the user 134.

In some implementations, the four-channel audio tracks may be recorded in an "A" format by the microphone array 107 such as a Tetramic microphone. The audio module 212 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some implementations, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. The audio module 212 may convolve the "B" format channels with Head Related Transfer Functions (HRTFs) to produce binaural audio with a compelling 3D listening experience for the user 134.

In some implementations, the audio module 212 generates 3D audio data that is configured to provide sound localization to be consistent with the user's head rotation. For example, if a sound is emanating from the user's right-hand side and the user rotates to face the sound, the audio reproduced during consumption of the VR content sounds as if it is coming from in front of the user.

In some implementations, the raw audio data is encoded with the directionality data that describes the directionality of the recorded sounds. The audio module 212 may analyze the directionality data to produce 3D audio data that changes the sound reproduced during playback based on the rotation of the user's head orientation. For example, the directionality of the sound may be rotated to match the angle of the user's head position. Assume that the VR content depicts a forest with a canopy of tree limbs overhead. The audio for the VR content includes the sound of a river. The directionality data indicates that the river is behind the user 134, and so the 3D audio data generated by the audio module 212 is configured to reproduce audio during playback that makes the river sound as if it is located behind the user 134. This is an example of the 3D audio data being configured to reproduce directionality. Upon hearing the audio for the river, the user 134 may sense that the river is behind him or her. The 3D audio data is configured so that as the user 134 tilts his or her head to the side, the sound of the water changes. As the angle of the tilt approaches 180 degrees relative to the starting point, the river sounds as though it is in front of the user 134. This is an example of the 3D audio data being configured to reproduce directionality based on the angle of the user's 134 head position. The 3D audio data may be configured so that the sound of the river becomes more distinct and clearer, and the user 134 has a better sense of how far the water is from the user 134 and how fast the water is flowing.

The stream combination module 214 may be software including routines for combining a stream of 3D video data and a stream of 3D audio data to generate VR content. The stream combination module 214 is communicatively coupled to the bus 220 via a signal line 229. The stream of 3D video data includes a stream of left panoramic images for left eye viewing and a stream of right panoramic images for right eye viewing. Redundancy exists between the stream of left panoramic images and the stream of right panoramic images.

The stream combination module 214 may compress the stream of left panoramic images and the stream of right panoramic images to generate a stream of compressed 3D video data using video compression techniques. In some implementations, within each stream of the left or right panoramic images, the stream combination module 214 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the stream combination module 214 may use one stream (either the stream of left panoramic images or the stream of right panoramic images)

as a reference stream and may compress the other stream based on the reference stream. This compression may be referred to as inter-stream compression. For example, the stream combination module 214 may use each left panoramic image as a reference frame for a corresponding right panoramic image and may compress the corresponding right panoramic image based on the referenced left panoramic image.

In some implementations, the stream combination module 214 may encode the stream of 3D video data (or compressed 3D video data) and 3D audio data to form a stream of VR content. For example, the stream combination module 214 may compress the stream of 3D video data using H.264 and the stream of 3D audio data using advanced audio coding (AAC). In another example, the stream combination module 214 may compress the stream of 3D video data and the stream of 3D audio data using a standard MPEG format. The VR content may be constructed by the stream combination module 214 using any combination of the stream of 3D video data (or the stream of compressed 3D video data), the stream of 3D audio data (or the stream of compressed 3D audio data), content data from the content server 139, advertisement data from the ad server 141, social data from the social network server 135, and any other suitable VR content.

In some implementations, the VR content may be packaged in a container format such as MP4, WebM, VP8, and any other suitable format. The VR content may be stored as a file on the client device 127 or the server 129 and may be streamed to the viewing system 133 for the user 134 from the client device 127 or the server 129. Alternatively, the VR content may be stored on a digital versatile disc (DVD), a flash memory, or another type of storage devices.

Figure 3:
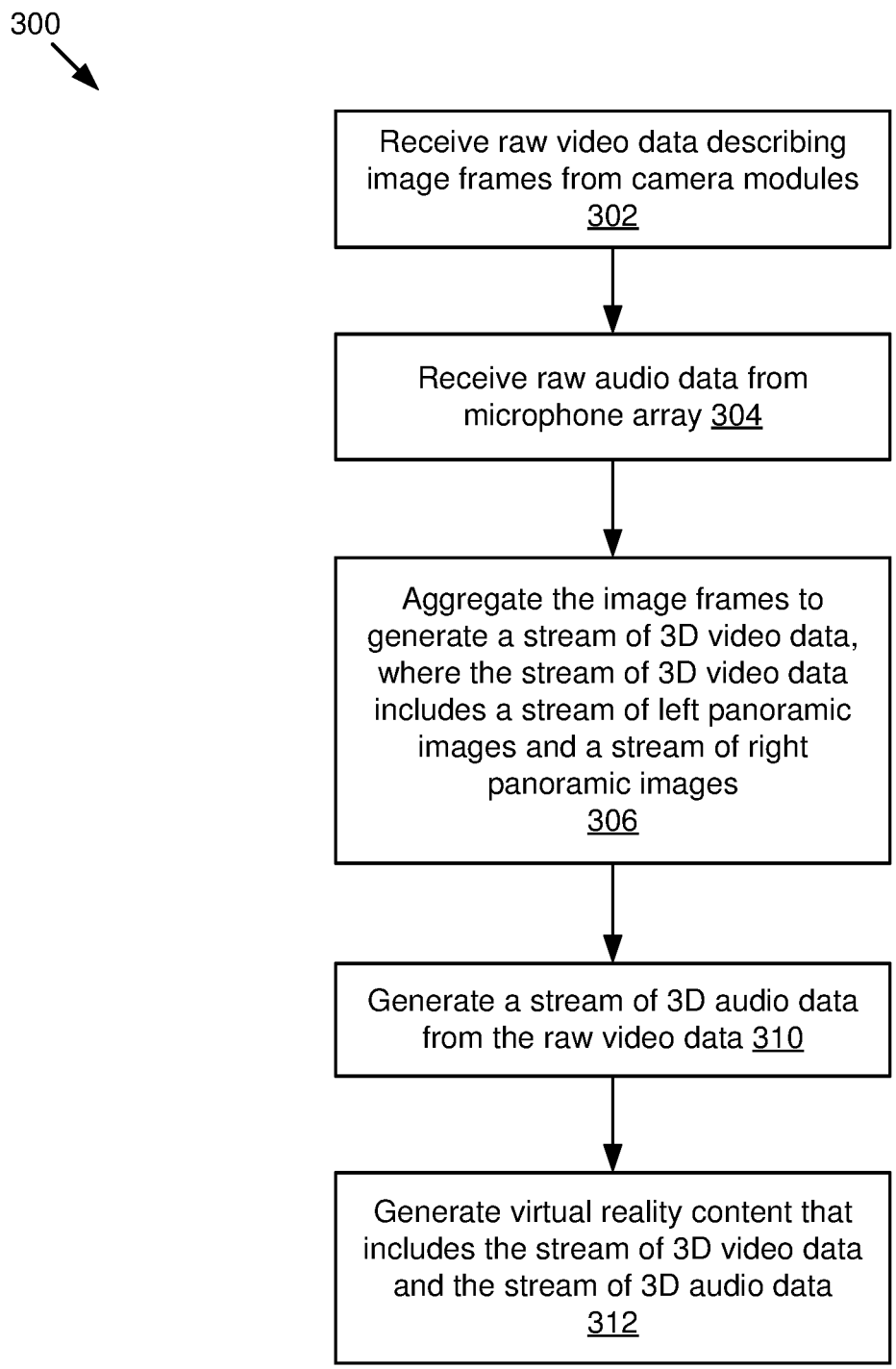
FIG. 3 illustrates an example method for aggregating image frames and audio data to generate VR content according to some implementations.

Referring now to FIG. 3, an example method 300 for aggregating image frames and audio data to generate VR content is described in accordance with at least some implementations described herein. The method 300 is described with respect to FIGS. 1 and 2. Although illustrated as discrete blocks, various blocks may be divided into additional blocks, combined into fewer blocks, or eliminated, depending on the desired implementation.

In the illustrated implementation of FIG. 3, the method 300 may include the communication module 202 receiving 302 raw video data. The raw video data may describe image frames from the camera modules 103. The communication module 202 receives 304 raw audio data from the microphone array 107. The video module 208 aggregates 306 the image frames to generate a stream of 3D video data. The stream of 3D video data includes a stream of left panoramic images and a stream of right panoramic images. The audio module 212 generates 310 a stream of 3D audio data from the raw audio data. The stream combination module 214 generates 312 VR content that includes the stream of 3D video data and the stream of 3D audio data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 4A:
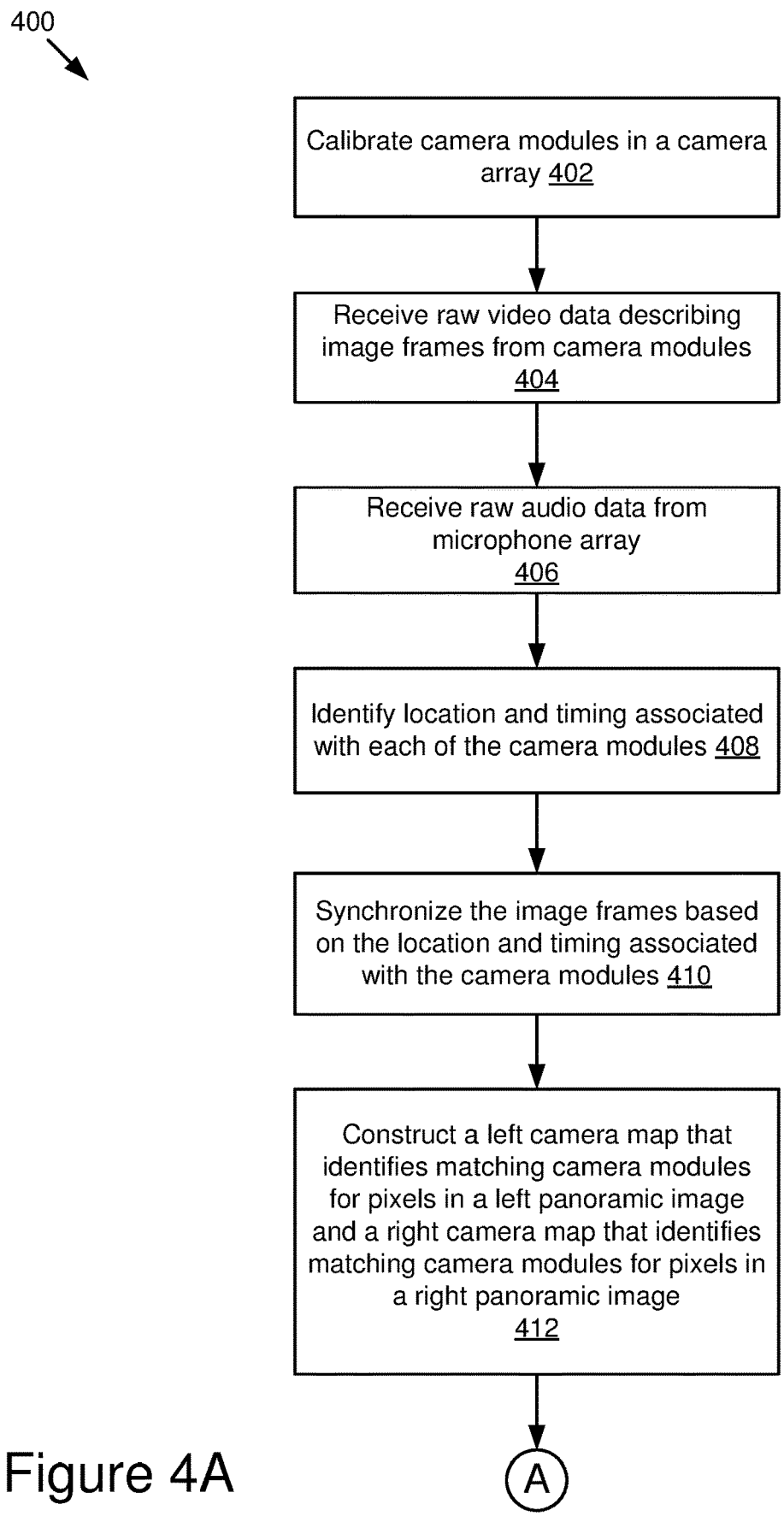
FIGS. 4A-4C illustrate another example method for aggregating image frames and audio data to generate VR content according to some implementations.
Figure 4B:
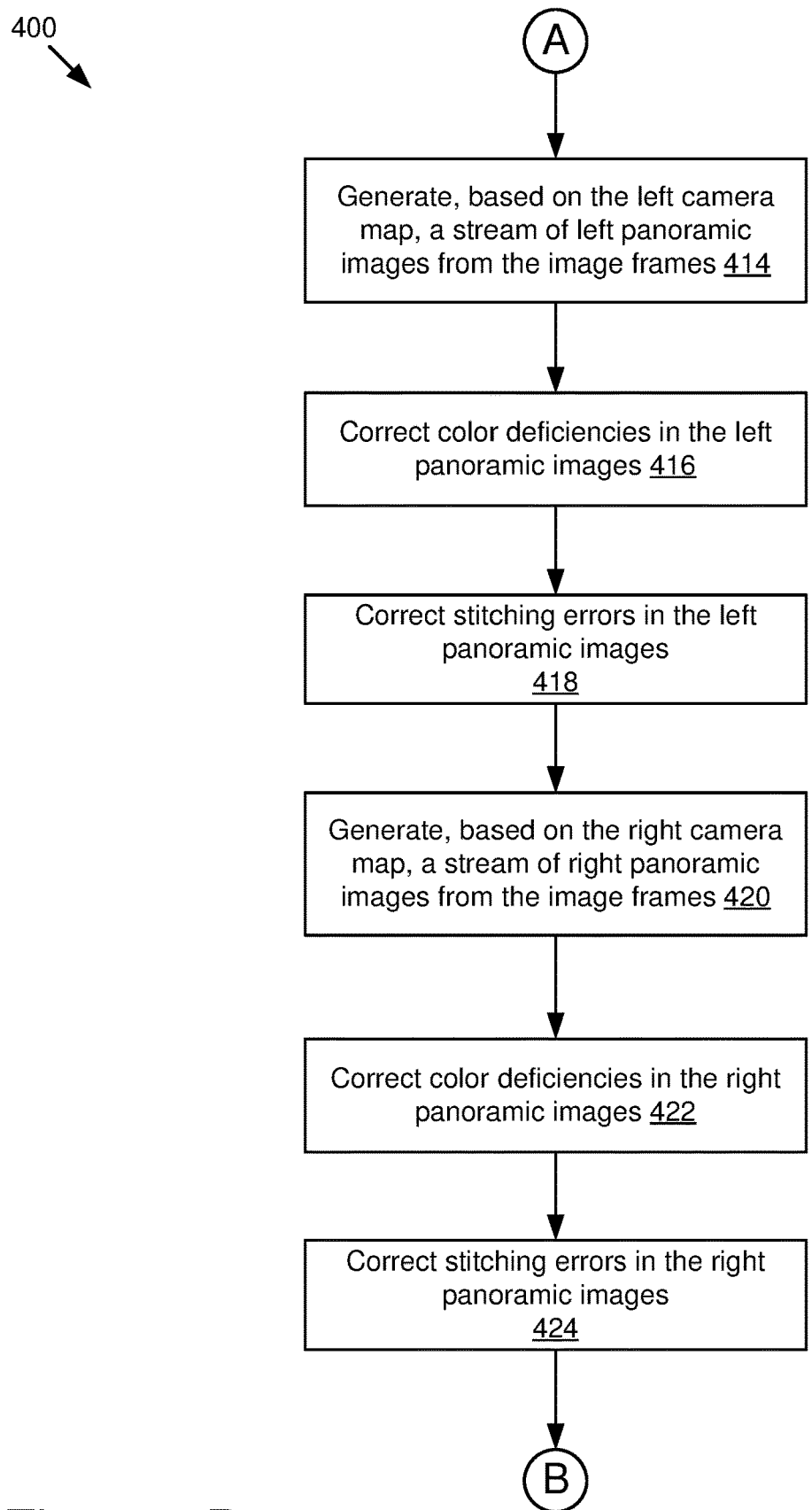
Figure 4C:
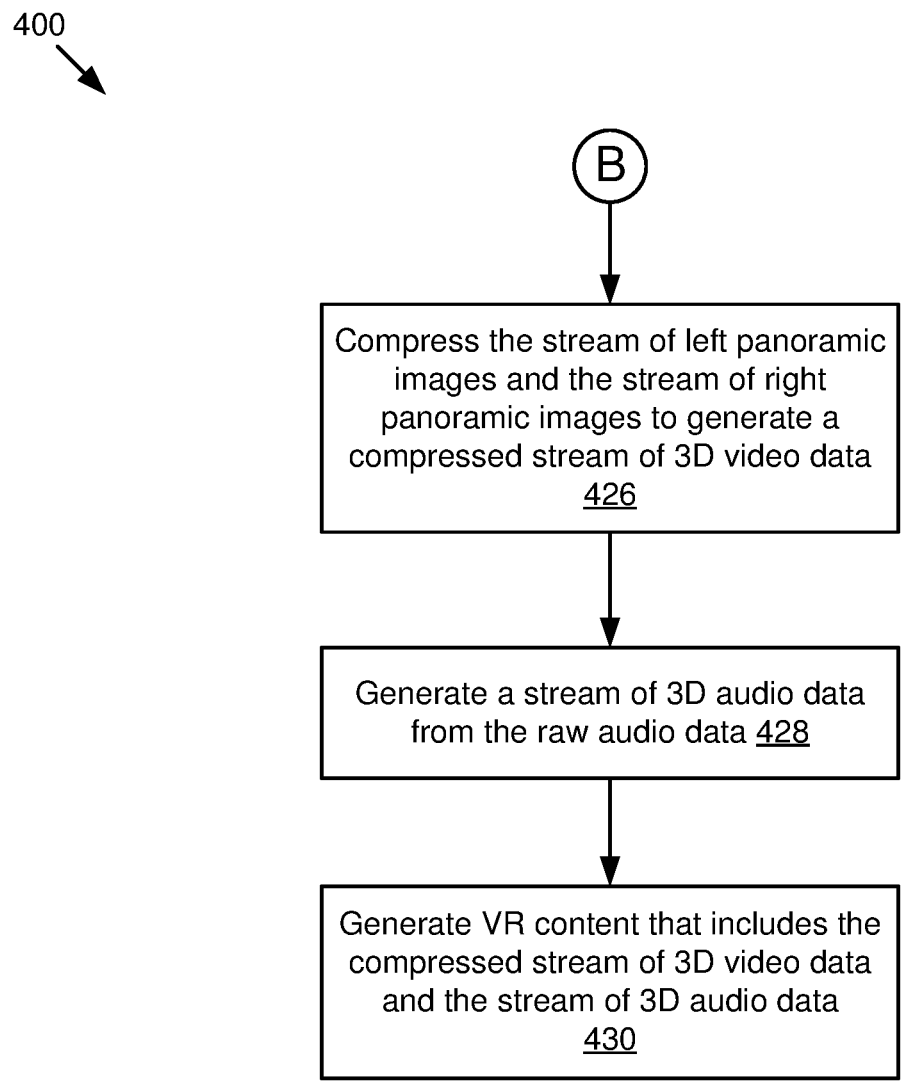

FIGS. 4A-4C illustrate another example method 400 for aggregating image frames and audio data to generate VR content according to some implementations. The method 400 is described with respect to FIGS. 1 and 2. Although illustrated as discrete blocks, various blocks may be divided into additional blocks, combined into fewer blocks, or eliminated, depending on the desired implementation.

Referring to FIG. 4A, the calibration module 204 calibrates 402 the camera modules 103 in the camera array 101. The communication module 202 receives 404 raw video data describing image frames from the camera modules 103. The communication module 202 receives 406 raw audio data from the microphone array 107. The video module 208 identifies 408 a location and timing associated with each of the camera modules 103. The video module 208 synchronizes 410 the images frames based on locations and timings associated with the camera modules 103. The camera mapping module 206 constructs 412 a left camera map and a right camera map. The left camera map identifies matching camera modules 103 for pixels in a left panoramic image. For example, for a pixel in a left panoramic image that represents a point in a panorama, the left camera map identifies a matching camera module 103 that has a better view to the point than other camera modules 103. Similarly, the right camera map identifies matching camera modules 103 for pixels in a right panoramic image.

Referring to FIG. 4B, the video module 208 generates 414, based on the left camera map, a stream of left panoramic images from the image frames. For example, the video module 208 identifies matching camera modules 103 for pixels in left panoramic images based on the left camera map. The video module 208 stitches image frames that are captured by the corresponding matching camera modules 103 at a particular time to form a corresponding left panoramic image. The correction module 210 corrects 416 color deficiencies in the left panoramic images. The correction module 210 corrects 418 stitching errors in the left panoramic images.

The video module 208 generates 420, based on the right camera map, a stream of right panoramic images from the image frames. For example, the video module 208 identifies matching camera modules 103 for pixels in right panoramic images based on the right camera map. The video module 108 stitches image frames that are captured by the corresponding matching camera modules 103 at a particular time to form a corresponding right panoramic image. The correction module 210 corrects 422 color deficiencies in the right panoramic images. The correction module 210 corrects 424 stitching errors in the right panoramic images.

Referring to FIG. 4C, the stream combination module 214 compresses 426 the stream of left panoramic images and the stream of right panoramic images to generate a compressed stream of 3D video data. The audio module 212 generates 428 a stream of 3D audio data from the raw audio data. The stream combination module 214 generates 430 VR content that includes the compressed stream of 3D video data and the stream of 3D audio data. In some implementations, the stream combination module 214 may also compress the stream of 3D audio data to form a compressed stream of 3D audio data, and the VR content may include the compressed stream of 3D video data and the compressed stream of 3D audio data.

Figure 5:
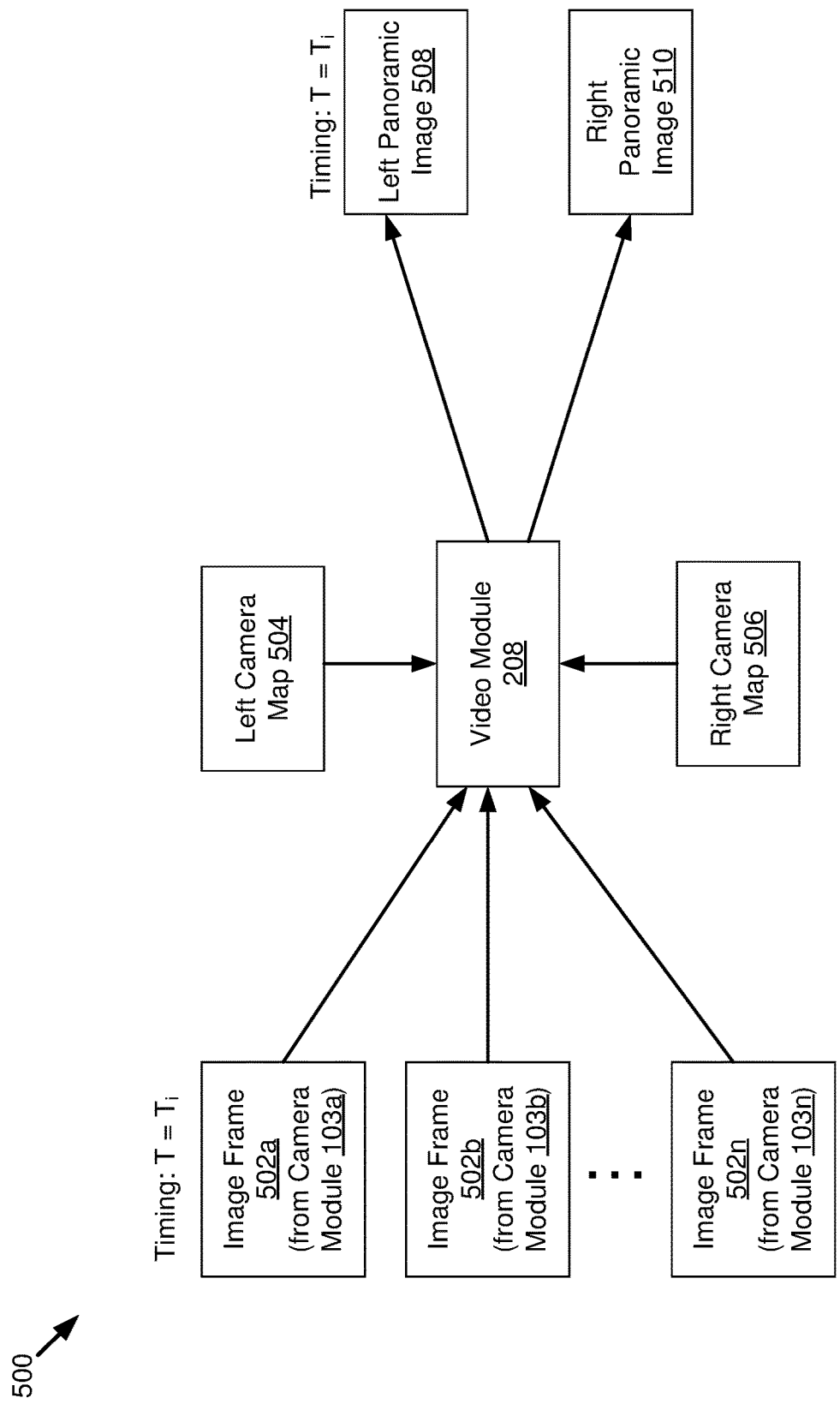
FIG. 5 illustrates an example process of generating a left panoramic image and a right panoramic image from multiple image frames that are captured by multiple camera modules at a particular time.

FIG. 5 illustrates an example process 500 of generating a left panoramic image and a right panoramic image from multiple image frames that are captured by multiple camera modules 103a, 103b . . . 103n at a particular time, arranged in accordance with at least some implementations described herein. At the particular time $T=T_i$ (i=0, 1, 2, . . . ), the camera module 103a captures an image frame 502a, the camera module 103b captures an image frame 502b, and the camera module 103n captures an image frame 502n. The video module 208 receives the image frames 502a, 502b, and 502n. The video module 208 aggregates the image frames 502a, 502b, and 502n to generate a left panoramic image 508 based on a left camera map 504 and a right panoramic image 510 based on a right camera map 506. The left panoramic image 508 and the right panoramic image 510 are associated with the particular time $T=T_i$.

FIG. 6A is a graphic representation 600 that illustrates an example panoramic image, arranged in accordance with at least some implementations described herein. The panoramic image has a first axis "yaw" which represents rotation in a horizontal plane and a second axis "pitch" which represents up and down rotation in a vertical direction. The panoramic image covers an entire 360-degree sphere of a scene panorama. A pixel at a position [yaw, pitch] in the panoramic image represents a point in a panorama viewed with a head rotation having a "yaw" value and a "pitch" value. Thus, the panoramic image includes a blended view from various head rotations rather than a single view of the scene from a single head position.

FIG. 6B is a graphic representation 650 that illustrates an example camera map, arranged in accordance with at least some implementations described herein. The example camera map matches first pixels in camera sections 652a and 652b of a panoramic image to a first matching camera module 103, second pixels in a camera section 654 to a second matching camera module 103, and third pixels in camera sections 656a and 656b to a third matching camera module 103. For the first pixels of the panoramic image within the camera sections 652a and 652b, values for the first pixels may be configured to be corresponding pixel values in a first image frame captured by the first matching camera module 103. Similarly, for the second pixels of the panoramic image within the camera section 654, values for the second pixels may be configured to be corresponding pixel values in a second image frame captured by the second matching camera module 103. For the third pixels of the panoramic image within the camera sections 656a and 656b, values for the third pixels may be configured to be corresponding pixel values in a third image frame captured by the third matching camera module 103. In this example, the panoramic image is stitched using part of the first image frame from the first matching camera module 103, part of the second image frame from the second matching camera module 103, part of the third image frame from the third matching camera module 103, and part of other image frames from other matching camera modules 103.

Figure 7A:
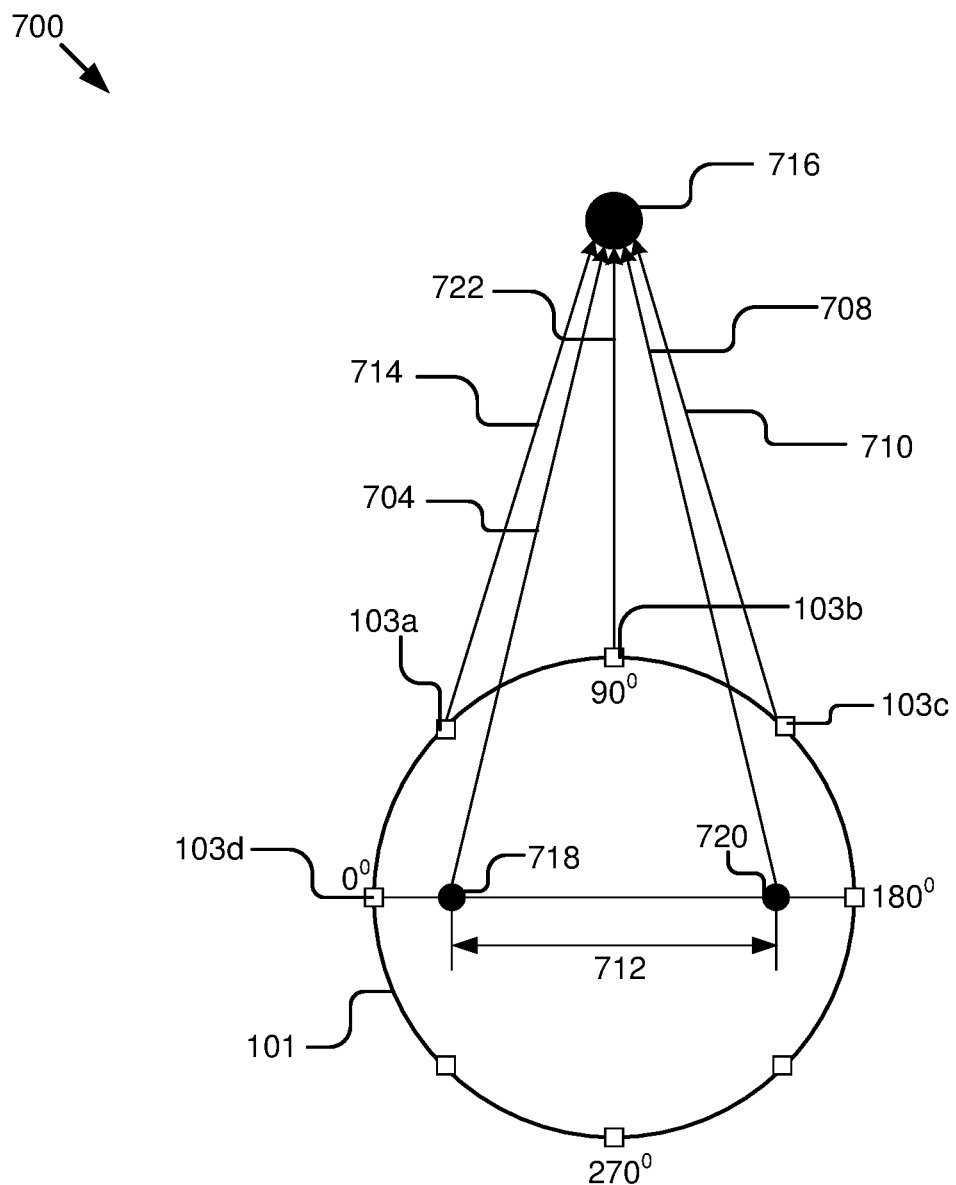
FIGS. 7A and 7B are graphic representations that illustrate example processes of selecting a first camera module for a pixel in a left panoramic image to construct a left camera map and selecting a second camera module for the pixel in a right panoramic image to construct a right camera map.
Figure 7B:
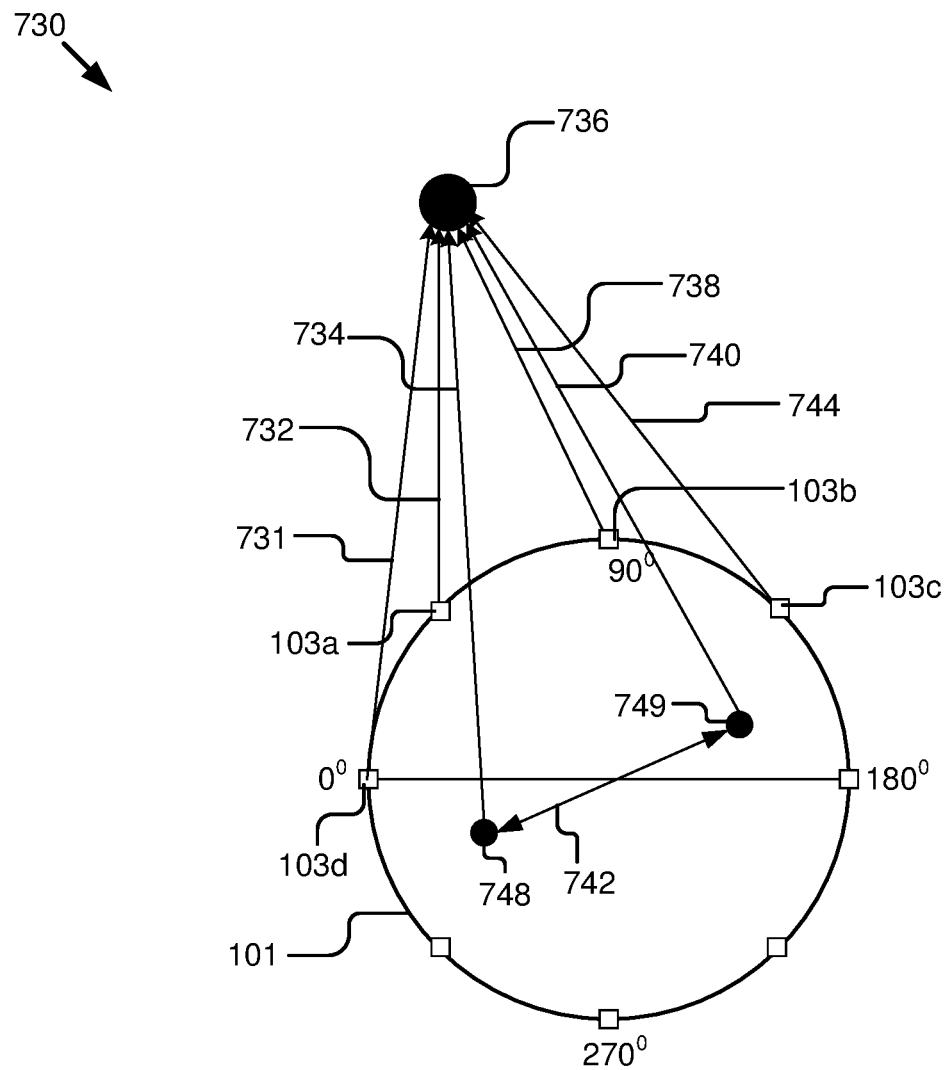

FIGS. 7A and 7B are graphic representations 700 and 730 that illustrate example processes of selecting matching camera modules 103 for a pixel in a left and a right panoramic images, arranged in accordance with at least some implementations described herein. Referring to FIG. 7A, the camera array 101 includes camera modules 103a, 103b, 103c, 103d and other camera modules mounted on a spherical housing. Assume that a point 716 corresponds to a head rotation position with yaw=90° and pitch=0°. An interocular distance 712 is illustrated between a left eye position 718 and a right eye position 720. Since pitch=0°, the interocular distance 712 is at its maximum value. The left eye position 718 and the right eye position 720 may be determined by: (1) drawing a first line from the point 716 to a center of the camera array 101; (2) determining an interocular distance based on a current pitch value; (3) drawing a second line that is perpendicular to the first line and also parallel to a plane with yaw=[0°, 360°] and pitch=0°, where the second line has a length equal to the determined interocular distance and is centered at the center of the camera array 101; and (4) configuring a left end point of the second line as the left eye position 718 and a right end point of the second line as the right eye position 720.

A left viewing direction 704 from the left eye position 718 to the point 716 and a right viewing direction 708 from the right eye position 720 to the point 716 are illustrated in FIG. 7A. The camera modules 103a, 103b, and 103c have viewing directions 714, 722, 710 to the point 716, respectively.

Since the viewing direction 714 of the camera module 103a is more parallel to the left viewing direction 704 compared to other viewing directions 722 and 710 (e.g., an angle between the viewing direction 714 and the left viewing direction 704 is smaller than angles between the left viewing direction 704 and other viewing directions 722 and 710), the camera module 103a is selected as a matching camera module that has a better view for the point 716 than other camera modules in a left camera map. Since the viewing direction 710 of the camera module 103c is more parallel to the right viewing direction 708 compared to other viewing directions 722 and 714, the camera module 103c is selected as a matching camera module that has a better view for the point 716 than other camera modules in a right camera map.

Referring to FIG. 7B, assume that a point 736 in a panorama corresponds to a head rotation position with yaw=80° and pitch=0°. An interocular distance 742 is illustrated between a left eye position 748 and a right eye position 749. A left viewing direction 734 from the left eye position 748 to the point 736 and a right viewing direction 740 from the right eye position 749 to the point 736 are illustrated in FIG. 7B. The camera modules 103a, 103b, 103c, and 103d have viewing directions 732, 738, 744, 731 to the point 736, respectively. Since the viewing direction 732 of the camera module 103a is more parallel to the left viewing direction 734 compared to other viewing directions 738, 744, 731, the camera module 103a is selected as a matching camera module that has a better view for the point 736 in a left camera map. Since the viewing direction 738 of the camera module 103b is more parallel to the right viewing direction 740 compared to other viewing directions 731, 734, 744, the camera module 103b is selected as a matching camera module that has a better view for the point 736 in a right camera map.

In some implementations, operations to determine a matching camera module for the point 736 in a left panoramic image for left eye viewing may be summarized as following: (1) determining a set of camera modules that have the point 736 in their respective fields of view; (2) determining the left viewing direction 734 from the left eye position 748 to the point 736; (3) determining a set of viewing directions to the point 736 for the set of camera modules; (4) selecting the viewing direction 732 from the set of viewing directions, where the viewing direction 732 forms a smallest angle with the left viewing direction 734 compared to angles formed between the left viewing direction 734 and other viewing directions in the set (in other words, the viewing direction 732 being more parallel to the left viewing direction 734 than the other viewing directions); and (5) configuring a matching camera module for the point 736 as the camera module 103a that has the viewing direction 732. Some other cost functions for determining the matching camera module for the point 736 in the left panoramic image are possible as long as the cost functions may define some notion of best approximation to the view from the left eye position 748.

Similarly, operations to determine a matching camera module for the point 736 in a right panoramic image for right eye viewing may be summarized as following: (1) determining the set of camera modules that have the point 736 in their respective fields of view; (2) determining the right viewing direction 740 from the right eye position 749 to the point 736; (3) determining the set of viewing directions to the point 736 for the set of camera modules; (4) selecting the viewing direction 738 from the set of viewing directions, where the viewing direction 738 forms a smallest angle with the right viewing direction 740 compared to angles formed between the right viewing direction 740 and other viewing directions in the set; and (5) configuring a matching camera module for the point 736 as the camera module 103b that has the viewing direction 738. Some other cost functions for determining the matching camera module for the point 736 in the right panoramic image are possible as long as the cost functions may define some notion of best approximation to the view from the right eye position 749.

Figure 8:
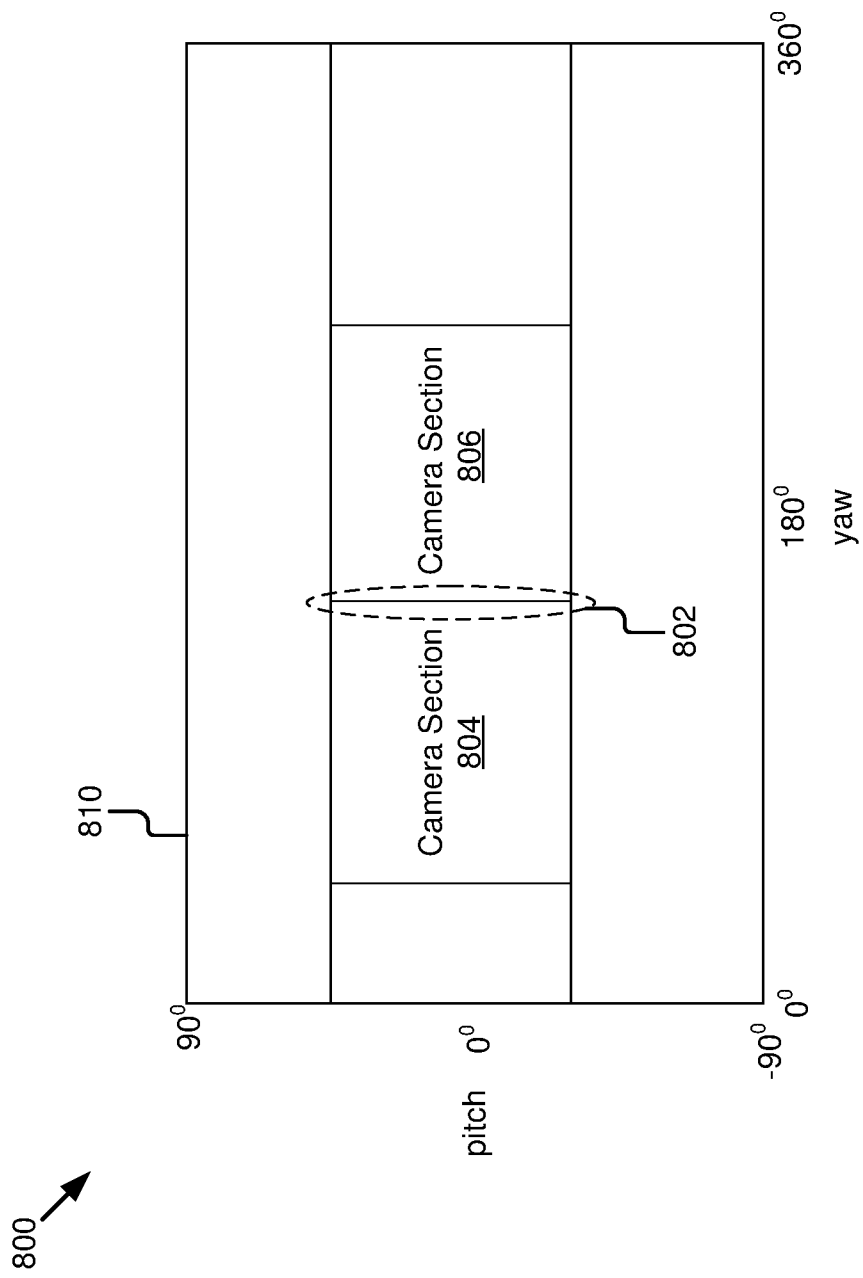
FIG. 8 is a graphic representation that illustrates an example process of blending pixels on a border of two camera sections.

FIG. 8 is a graphic representation 800 that illustrates an example process of blending pixels on a border of two camera sections, arranged in accordance with at least some implementations described herein. By way of example, the following description refers to blending pixels on a border 802 of two camera sections 804 and 806. More generally, the description also applies to blending pixels on borders of other camera sections.

Referring to FIG. 8, an example camera map 810 maps pixels in camera sections 804 and 806 to a first matching camera module 103 and a second matching camera module 103, respectively. In other words, the first matching camera module 103 has a better view for first pixels in the camera section 804 than other camera modules, and the second camera module 103 has a better view for second pixels in the camera section 806 than other camera modules.

For pixels of a panoramic image located inside the camera section 804, values for the pixels may be configured to be corresponding pixel values captured by the first matching camera module 103. Similarly, for pixels of a panoramic image inside the camera section 806, values for the pixels may be configured to be corresponding pixel values captured by the second matching camera module 103. However, for pixels of a panoramic image on the border 802, first pixel values captured by the first matching camera module 103 may be blended with second pixel values captured by the second matching camera module 103 to form pixel values of the panoramic image on the border 802 so that visible seams caused by slight color or lighting mismatches between camera modules may be reduced or eliminated on the border 802.

For example, the first pixel values captured by the first camera module 103 may be separated into a first high-frequency part and a first low-frequency part, and the second pixel values captured by the first camera module 103 may be separated into a second high-frequency part and a second low-frequency part. The first low-frequency part and the second low-frequency part may be combined to form a blended low-frequency part using weights associated with the corresponding camera modules. One of the first high-frequency part and the second high-frequency part may be selected and may be combined with the blended low-frequency part to form pixel values for the blended pixels on the border 802. For example, the blended pixels may be obtained as:

(values of blended pixels) =

(high-frequency part associated with a selected camera module) +

$$\sum_{i=1}^{M} (\text{low-frequency part of camera module } i) \times W_i,$$

where M represents a total number of camera modules (or matching camera modules) that capture the pixels on the border 802, and $W_i$ represents a weight for the corresponding camera module i.

The weight $W_i$ for the low-frequency part of the camera module i may decline as a viewing point of a user moves toward a field of view boundary of the camera module i. For example, as the user rotates his or her head and the user's viewing point moves from the field of view of the camera module i to a field of view of a camera module i+1, the weight $W_i$ for the low-frequency part of the camera module i may decline to zero and a weight for the low-frequency part of the camera module i+1 may increase from zero to a non-zero value.

In some implementations, the weights for the low-frequency parts of the camera modules may be stored in a camera map. As described above, a camera map may store an entry "(an identifier of a matching camera module, x, y)" in a map entry related to an input (yaw, pitch), where the input (yaw, pitch) may represent a pixel (yaw, pitch) in a panoramic image and (x, y) may represent a pixel at the position (x, y) in an image plane of the identified matching camera module. The camera map may also store a respective weight for a low-frequency part of each identified matching camera module. For example, the camera map may store an entry "(an identifier of a matching camera module, x, y, a weight for a low-frequency part of the matching camera module)" in the map entry related to the input (yaw, pitch).

Figure 9A:
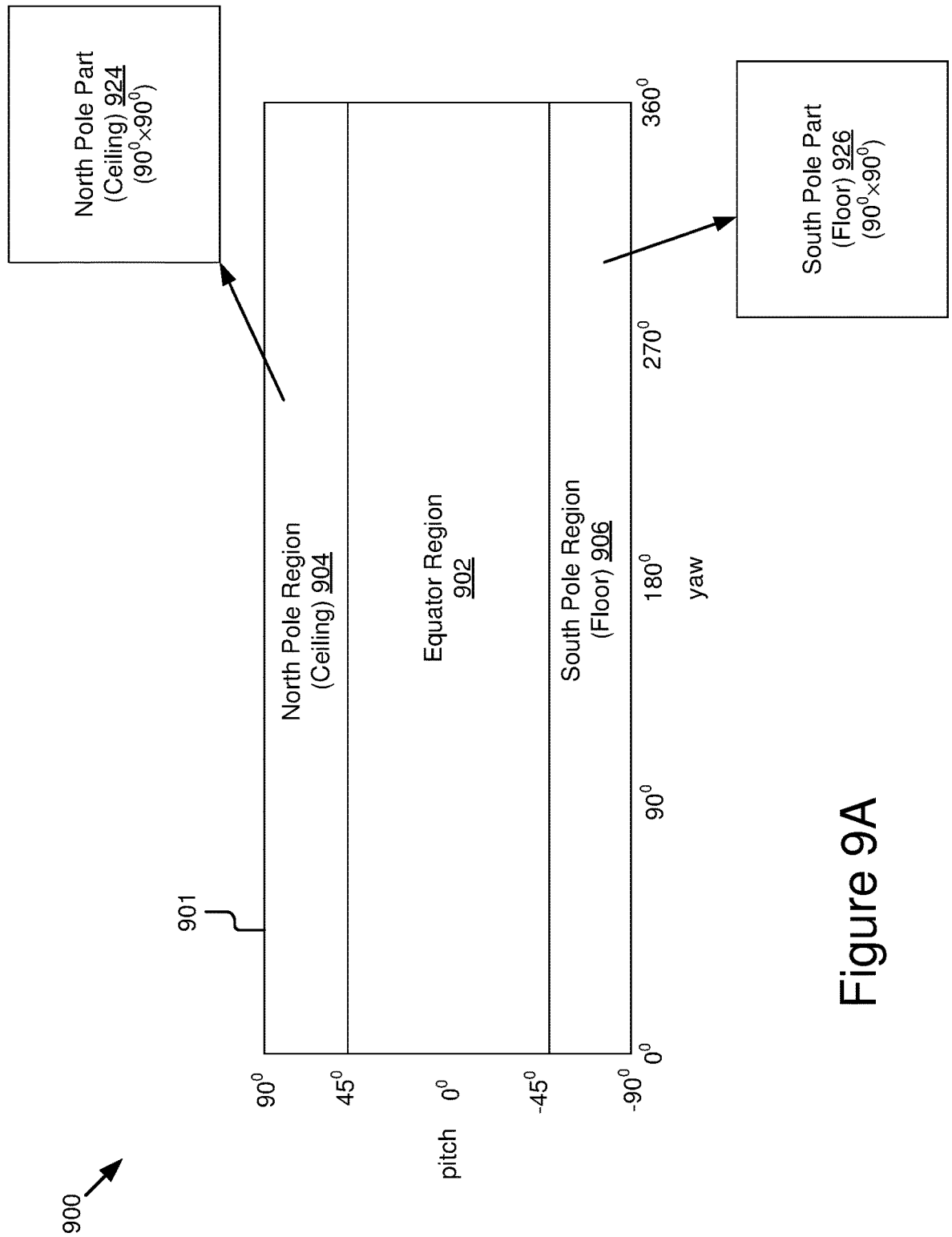
FIGS. 9A and 9B are graphic representations that illustrate an example panoramic image with improved representation.
Figure 9B:
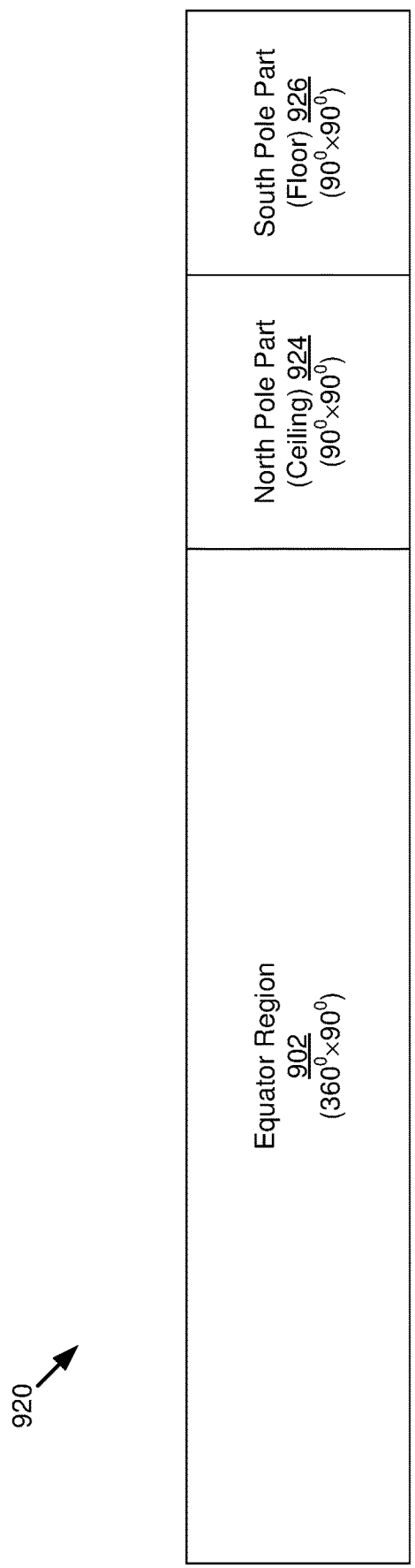

FIGS. 9A and 9B are graphic representations 900 and 920 that illustrate an example panoramic image (e.g., a left or right panoramic image) with improved representation, arranged in accordance with at least some implementations described herein. Referring to FIG. 9A, an example panoramic image 901 may include an equator region 902 (360°×90°), a north pole region 904 (e.g., a 360°×45° ceiling region), and a south pole region 906 (e.g., a 360°×45° floor region). The equator region 902 may include an area with less distortion than the north pole region 904 and the south pole region 906.

Rather than constructing a panorama using the panoramic image 901 that includes the regions 902, 904, and 906, the panorama may be constructed using the equator region 902, a square north pole part 924 (90°×90°, with the north pole in the center of the north pole part 924), and a square south pole part 926 (90°×90°, with the south pole in the center of the south pole part 926). In other words, the north pole part 924 and the south pole part 926 may replace the north pole region 904 and the south pole region 906 to construct the panorama, respectively. For example, the panorama may be constructed by pasting the equator region 902 into a middle section of a sphere, the square north pole part 924 into a top section of the sphere, and the square south pole part 926 into a bottom section of the sphere. The north pole part 924 has a circumference of 90°×4=360°, which matches a top edge of the equator region 902. Similarly, the south pole part 926 has a circumference of 90°×4=360°, which matches a bottom edge of the equator region 902.

Compared to the panorama constructed using the regions 902, 904, and 906 of FIG. 9A, the panorama constructed using the equator region 902, the north pole part 924, and the south pole part 926 has less pixels (e.g., 25% less pixels) and less distortion in the polar regions. The resolution for the parts 924 and 926 may be lower than the resolution for the equator region 902, which further improves efficiency of representing the panorama. The equator region 902, the north pole part 924, and the south pole part 926 may be arranged as a rectangular image as illustrated in FIG. 9B and transmitted to the viewing system 133.

Figure 10:
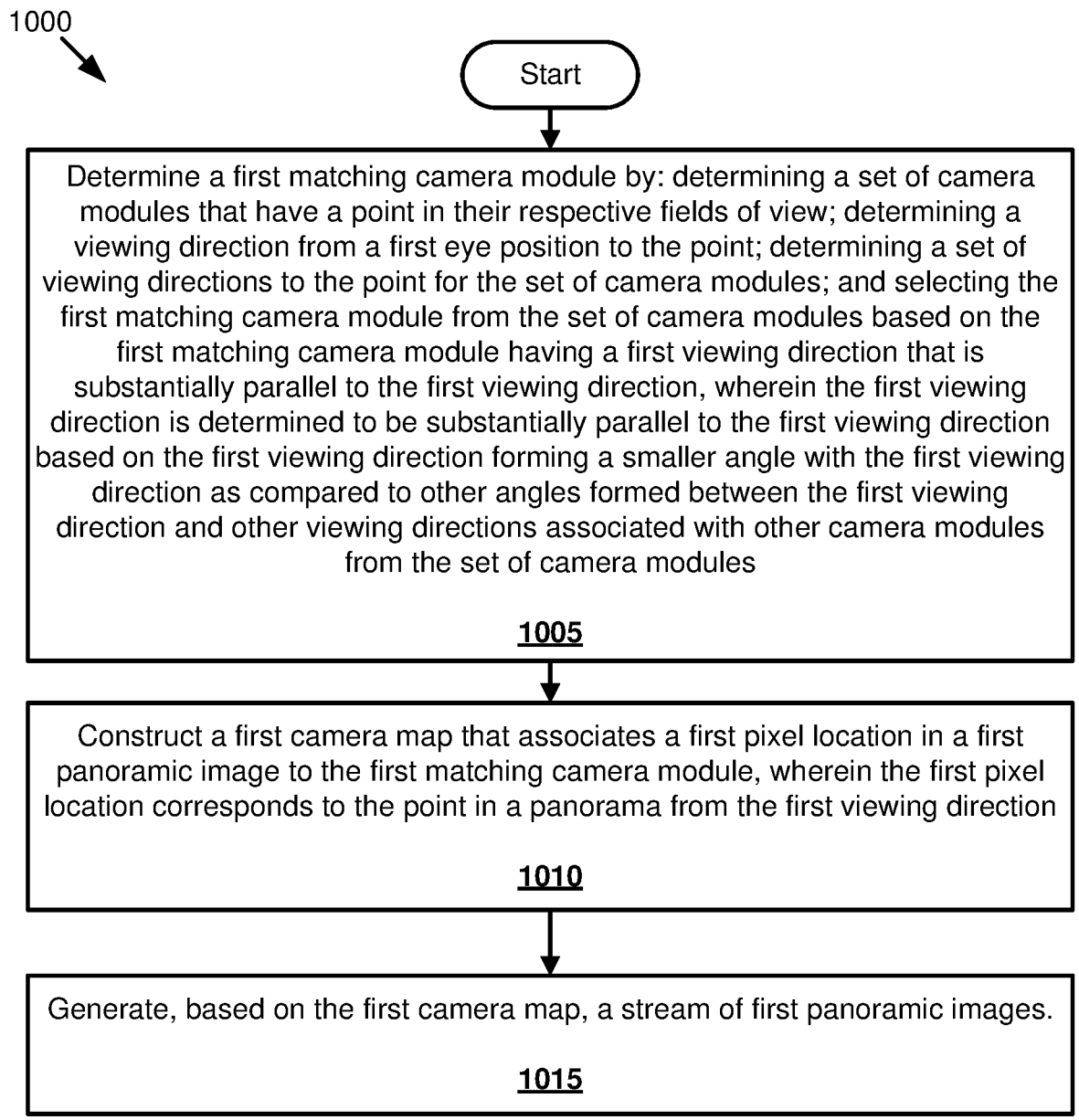
FIG. 10 is an example method for generating content according to some implementations.

FIG. 10 is an example method 1000 for generating content according to some implementations.

Step 1006 includes determining a first matching camera module by: (1) determining a set of camera modules that have a point in their respective fields of view; (2) determining a viewing direction from a first eye position to the point; (3) determining a set of viewing directions to the point for the set of camera modules; and (4) selecting the first matching camera module from the set of camera modules based on the first matching camera module having a first viewing direction that is substantially parallel to the first viewing direction, wherein the first viewing direction is determined to be substantially parallel to the first viewing direction based on the first viewing direction forming a smaller angle with the first viewing direction as compared to other angles formed between the first viewing direction and other viewing directions associated with other camera modules from the set of camera modules.

Step 1010 includes constructing a first camera map that associates a first pixel location in a first panoramic image to the first matching camera module, wherein the first pixel location corresponds to the point in a panorama from the first viewing direction.

Step 1015 includes generating, based on the first camera map, a stream of first panoramic images.

In some embodiments, the term "first" may be replaced by the term "left" in the method 1000 (e.g., a "first" eye is a "left" eye) and the term "second" may be replaced by the term "right" (e.g., a "second" eye is a "right" eye).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: determining a first matching camera module by (1) determining a set of camera modules that have a point in their respective fields of view, (2) determining a viewing direction from a first eye position to the point, (3) determining a set of viewing directions to the point for the set of camera modules, and (4) selecting the first matching camera module from the set of camera modules based on the first matching camera module having a first viewing direction that is substantially parallel to the first viewing direction, where the first viewing direction is determined to be substantially parallel to the first viewing direction based on the first viewing direction forming a smaller angle with the first viewing direction as compared to other angles formed between the first viewing direction and other viewing directions associated with other camera modules from the set of camera modules. The method also includes constructing a first camera map that associates a first pixel location in a first panoramic image to the first matching camera module, where the first pixel location corresponds to the point in a panorama from the first viewing direction. The method also includes generating, based on the first camera map, a stream of first panoramic images. Other embodiments of this aspect include corresponding computer systems, apparatus, and computer programs recorded on one or more computer storage devices, each configured to perform the actions of the methods.

Implementations may include one or more of the following features. The method further including. The method may also include constructing a second camera map that associates a second pixel location in a second panoramic image to a second matching camera module, where the second pixel location corresponds to the point in the panorama from a second viewing direction and the second matching camera module is selected based on having a second field of view that includes a second viewing direction that is parallel to the second viewing direction as compared to the other viewing directions associated with the other camera modules. The method may also include generating, based on the second camera map, a stream of second panoramic images. The method further including generating a stream of 3D video data from the stream of first panoramic images and the stream of second panoramic images. The method where generating the stream of 3d video data includes: identifying first matching camera modules for first panoramic images based on a first camera map; identifying second matching camera modules for second panoramic images based on a second camera map; stitching first image frames captured by the first matching camera modules at a particular time to form a corresponding first panoramic image in the stream of first panoramic images; and stitching second image frames captured by the second matching camera modules at a particular time to form a corresponding second panoramic image in the stream of second panoramic images. The method where: for a pixel with a yaw value and a pitch value in a panorama. The method may also include the first camera map identifies a first matching camera module for the pixel in the panorama and matches the pixel in the panorama to a pixel in an image plane of the first matching camera module. The method may also include the second camera map identifies a second matching camera module for the pixel in the panorama and matches the pixel in the panorama to a pixel in an image plane of the second matching camera module. The method where: the first camera map associates a pixel location in first panoramic images to a corresponding first matching camera module, where the pixel location corresponds to a point of a panorama in a first viewing direction; the corresponding first matching camera module has a field of view that includes a viewing direction to the point of the panorama; and the viewing direction of the corresponding first matching camera module is closer to the first viewing direction than other viewing directions associated with other camera modules. The method where generating the stream of 3d video data includes: determining a current viewing direction associated with a user; and generating the stream of first panoramic images and the stream of second panoramic images based on the current viewing direction. Implementations of the described techniques may include hardware, a method or process, or computer software on a computer-accessible medium.

One general aspect includes a system including: one or more processors, one or more non-transitory tangible computer-readable mediums communicatively coupled to the one or more processors and storing executable instructions executable by the one or more processors to perform operations including: determining a first matching camera module by (1) determining a set of camera modules that have a point in their respective fields of view, (2) determining a viewing direction from a first eye position to the point, (3) determining a set of viewing directions to the point for the set of camera modules, and (4) selecting the first matching camera module from the set of camera modules based on the first matching camera module having a first viewing direction that is substantially parallel to the first viewing direction, where the first viewing direction is determined to be substantially parallel to the first viewing direction based on the first viewing direction forming a smaller angle with the first viewing direction as compared to other angles formed between the first viewing direction and other viewing directions associated with other camera modules from the set of camera modules. The system also includes constructing a first camera map that associates a first pixel location in a first panoramic image to the first matching camera module, where the first pixel location corresponds to the point in a panorama from the first viewing direction. The system also includes generating, based on the first camera map, a stream of first panoramic images. Other embodiments of this aspect include corresponding computer systems, apparatus, and computer programs recorded on one or more computer storage devices, each configured to perform the actions of the methods.

One general aspect includes a computer program product including a non-transitory computer-usable medium including a computer-readable program, where the computer-readable program when executed on a computer causes the computer to: determine a first matching camera module by (1) determining a set of camera modules that have a point in their respective fields of view, (2) determining a viewing direction from a first eye position to the point, (3) determining a set of viewing directions to the point for the set of camera modules, and (4) selecting the first matching camera module from the set of camera modules based on the first matching camera module having a first viewing direction that is substantially parallel to the first viewing direction, where the first viewing direction is determined to be substantially parallel to the first viewing direction based on the first viewing direction forming a smaller angle with the first viewing direction as compared to other angles formed between the first viewing direction and other viewing directions associated with other camera modules from the set of camera modules. The computer program product also includes construct a first camera map that associates a first pixel location in a first panoramic image to the first matching camera module, where the first pixel location corresponds to the point in a panorama from the first viewing direction. The computer program product also includes generate, based on the first camera map, a stream of first panoramic images. Other embodiments of this aspect include corresponding computer systems, apparatus, and computer programs recorded on one or more computer storage devices, each configured to perform the actions of the methods.

The implementations described herein may include the use of a special-purpose or general-purpose computer including various computer hardware or software modules, as discussed in greater detail below.

Implementations described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although implementations of the present disclosures have been described in detail, it may be understood that the various changes, substitutions, and alterations could be made hereto without departing from the spirit and scope of the disclosure.

What is claimed is:

1. A method comprising:
   determining a first matching camera module by:
      determining a set of camera modules that have a point in their respective fields of view;
      determining a first eye viewing direction from a first eye position to the point;
      determining a set of camera viewing directions to the point for the set of camera modules; and
      selecting the first matching camera module from the set of camera modules based on the first matching camera module having a first camera viewing direction that is substantially parallel to the first eye viewing direction, wherein the first camera viewing direction is determined to be substantially parallel to the first eye viewing direction based on the first camera viewing direction forming a smaller angle with the first eye viewing direction as compared to other angles formed between the first eye viewing direction and other camera viewing directions associated with other camera modules from the set of camera modules;

constructing a first camera map that associates a first pixel location in a first panoramic image to the first matching camera module, wherein the first pixel location corresponds to the point in a panorama from the first eye viewing direction, wherein the first camera map indicates a weight to be used to blend a pixel value for the first pixel location with a pixel value for a bordering pixel location associated with another camera module in the set of camera modules; and generating, based on the first camera map, a stream of first panoramic images.

2. The method of claim 1, further comprising constructing a second camera map that associates a second pixel location in a second panoramic image to a second matching camera module, wherein the second pixel location corresponds to the point in the panorama from a second eye viewing direction and the second matching camera module is selected based on having a second field of view that includes a second camera viewing direction that is most parallel to the second eye viewing direction as compared to the other camera viewing directions associated with the other camera modules; and generating, based on the second camera map, a stream of second panoramic images.

3. The method of claim 2, further comprising generating a stream of three dimensional (3D) video data from the stream of first panoramic images and the stream of second panoramic images.

4. The method of claim 3, wherein generating the stream of 3D video data comprises:

identifying first matching camera modules for first panoramic images based on a first camera map;

identifying second matching camera modules for second panoramic images based on a second camera map;

stitching first image frames captured by the first matching camera modules at a particular time to form a corresponding first panoramic image in the stream of first panoramic images; and stitching second image frames captured by the second matching camera modules at a particular time to form a corresponding second panoramic image in the stream of second panoramic images.

5. The method of claim 3, wherein:

for a pixel with a yaw value and a pitch value in a panorama:

the first camera map identifies a first matching camera module for the pixel in the panorama and matches the pixel in the panorama to a pixel in an image plane of the first matching camera module; and the second camera map identifies a second matching camera module for the pixel in the panorama and matches the pixel in the panorama to a pixel in an image plane of the second matching camera module.

6. The method of claim 3, wherein:

the first camera map associates a pixel location in first panoramic images to a corresponding first matching camera module, wherein the pixel location corresponds to a point of a panorama in a first viewing direction;

the corresponding first matching camera module has a field of view that includes a viewing direction to the point of the panorama; and the viewing direction of the corresponding first matching camera module is closer to the first viewing direction than other viewing directions associated with other camera modules.

7. The method of claim 3, wherein generating the stream of 3D video data comprises:

determining a current viewing direction associated with a user; and generating the stream of first panoramic images and the stream of second panoramic images based on the current viewing direction.

8. The method of claim 2, wherein:

the first eye viewing direction is a right eye viewing direction from a right eye position to the point; and the second eye viewing direction is a left eye viewing direction from a left eye position to the point.

9. A system comprising:

one or more processors;

one or more non-transitory tangible computer-readable mediums communicatively coupled to the one or more processors and storing executable instructions executable by the one or more processors to perform operations comprising:

determining a first matching camera module by:

determining a set of camera modules that have a point in their respective fields of view;

determining a first eye viewing direction from a first eye position to the point;

determining a set of camera viewing directions to the point for the set of camera modules; and selecting the first matching camera module from the set of camera modules based on the first matching camera module having a first camera viewing direction that is substantially parallel to the first eye viewing direction, wherein the first camera viewing direction is determined to be substantially parallel to the first eye viewing direction based on the first camera viewing direction forming a smaller angle with the first eye viewing direction as compared to other angles formed between the first eye viewing direction and other camera viewing directions associated with other camera modules from the set of camera modules;

constructing a first camera map that associates a first pixel location in a first panoramic image to the first matching camera module, wherein the first pixel location corresponds to the point in a panorama from the first eye viewing direction, wherein the first camera map indicates a weight to be used to blend a pixel value for the first pixel location with a pixel value for a bordering pixel location associated with another camera module in the set of camera modules; and generating, based on the first camera map, a stream of first panoramic images.

10. The system of claim 9, wherein the instructions executable by the one or more processors are executable to cause the processors to perform additional operations including:

constructing a second camera map that associates a second pixel location in a second panoramic image to a second matching camera module, wherein the second pixel location corresponds to the point in the panorama from a second eye viewing direction and the second matching camera module is selected based on having a second field of view that includes a second camera viewing direction that is most parallel to the second eye viewing direction as compared to the other camera viewing directions associated with the other camera modules; and generating, based on the second camera map, a stream of second panoramic images.

11. The system of claim 10, wherein the instructions executable by the one or more processors are executable to cause the processors to perform additional operations including generating a stream of three dimensional (3D) video data from the stream of first panoramic images and the stream of second panoramic images.

12. The system of claim 11, wherein generating the stream of 3D video data comprises:
identifying first matching camera modules for first panoramic images based on a first camera map;
identifying second matching camera modules for second panoramic images based on a second camera map;
stitching first image frames captured by the first matching camera modules at a particular time to form a corresponding first panoramic image in the stream of first panoramic images; and
stitching second image frames captured by the second matching camera modules at a particular time to form a corresponding second panoramic image in the stream of second panoramic images.

13. The system of claim 11, wherein:
the first camera map associates a pixel location in first panoramic images to a corresponding first matching camera module, wherein the pixel location corresponds to a point of a panorama in a first viewing direction;
the corresponding first matching camera module has a field of view that includes a viewing direction to the point of the panorama; and
the viewing direction of the corresponding first matching camera module is closer to the first viewing direction than other viewing directions associated with other camera modules.

14. The system of claim 11, wherein:
for a pixel with a yaw value and a pitch value in a panorama:
the first camera map identifies a first matching camera module for the pixel in the panorama and matches the pixel in the panorama to a pixel in an image plane of the first matching camera module; and
the second camera map identifies a second matching camera module for the pixel in the panorama and matches the pixel in the panorama to a pixel in an image plane of the second matching camera module.

15. The system of claim 11, wherein generating the stream of 3D video data comprises:
determining a current viewing direction associated with a user; and
generating the stream of first panoramic images and the stream of second panoramic images based on the current viewing direction.

16. A computer program product comprising a non-transitory computer-usable medium including a computer-readable program, wherein the computer-readable program when executed on a computer causes the computer to:
determine a first matching camera module by:
determining a set of camera modules that have a point in their respective fields of view;
determining a first eye viewing direction from a first eye position to the point;
determining a set of camera viewing directions to the point for the set of camera modules; and
selecting the first matching camera module from the set of camera modules based on the first matching camera module having a first camera viewing direction that is substantially parallel to the first eye viewing direction, wherein the first camera viewing direction is determined to be substantially parallel to the first eye viewing direction based on the first camera viewing direction forming a smaller angle with the first eye viewing direction as compared to other angles formed between the first eye viewing direction and other camera viewing directions associated with other camera modules from the set of camera modules;
construct a first camera map that associates a first pixel location in a first panoramic image to the first matching camera module, wherein the first pixel location corresponds to the point in a panorama from the first eye viewing direction, wherein the first camera map indicates a weight to be used to blend a pixel value for the first pixel location with a pixel value for a bordering pixel location associated with another camera module in the set of camera modules; and
generate, based on the first camera map, a stream of first panoramic images.

17. The compute program product of claim 16, wherein computer-readable program when executed on the computer further cause the computer to:
construct a second camera map that associates a second pixel location in a second panoramic image to a second matching camera module, wherein the second pixel location corresponds to the point in the panorama from a second eye viewing direction and the second matching camera module is selected based on having a second field of view that includes a second camera viewing direction that is most parallel to the second eye viewing direction as compared to the other camera viewing directions associated with the other camera modules; and
generate, based on the second camera map, a stream of second panoramic images.

18. The computer program product of claim 17, wherein the computer-readable program when executed on the computer further cause the computer to generate a stream of three dimensional (3D) video data from the stream of first panoramic images and the stream of second panoramic images.

19. The computer program product of claim 18, wherein generating the stream of 3D video data comprises:
identifying first matching camera modules for first panoramic images based on a first camera map;
identifying second matching camera modules for second panoramic images based on a second camera map;
stitching first image frames captured by the first matching camera modules at a particular time to form a corresponding first panoramic image in the stream of first panoramic images; and
stitching second image frames captured by the second matching camera modules at a particular time to form a corresponding second panoramic image in the stream of second panoramic images.

20. The computer program product of claim 18, wherein:
the first camera map associates a pixel location in first panoramic images to a corresponding first matching camera module, wherein the pixel location corresponds to a point of a panorama in a first viewing direction;

the corresponding first matching camera module has a field of view that includes a viewing direction to the point of the panorama; and the viewing direction of the corresponding first matching camera module is closer to the first viewing direction than other viewing directions associated with other camera modules.

\* \* \* \* \*